United States Patent
Uejo et al.

(10) Patent No.: US 11,354,890 B2
(45) Date of Patent: Jun. 7, 2022

(54) INFORMATION PROCESSING APPARATUS CALCULATING FEEDBACK INFORMATION FOR PARTIAL REGION OF IMAGE AND NON-TRANSITORY COMPUTER READABLE MEDIUM STORING PROGRAM

(71) Applicant: FUJIFILM Business Innovation Corp., Tokyo (JP)

(72) Inventors: Hiroyoshi Uejo, Kanagawa (JP); Yuki Yamanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/920,757

(22) Filed: Jul. 6, 2020

(65) Prior Publication Data
US 2021/0248402 A1    Aug. 12, 2021

(30) Foreign Application Priority Data
Feb. 12, 2020   (JP) .............................. JP2020-021692

(51) Int. Cl.
| | | |
|---|---|---|
| *G06K 9/62* | (2022.01) | |
| *G06K 9/00* | (2022.01) | |
| *G06V 10/98* | (2022.01) | |
| *G06V 10/20* | (2022.01) | |
| *G06V 10/22* | (2022.01) | |
| *G06V 30/10* | (2022.01) | |

(52) U.S. Cl.
CPC ......... *G06V 10/993* (2022.01); *G06K 9/6256* (2013.01); *G06K 9/6261* (2013.01); *G06V 10/20* (2022.01); *G06V 10/22* (2022.01); *G06V 30/10* (2022.01)

(58) Field of Classification Search
CPC .... G06K 9/036; G06K 9/2054; G06K 9/6256; G06K 9/6261; G06K 9/36; G06K 2209/01
See application file for complete search history.

(56) References Cited

U.S. PATENT DOCUMENTS

| | | | | |
|---|---|---|---|---|
| 2003/0169923 A1* | 9/2003 | Butterworth | ............. | G06K 9/20 382/181 |
| 2006/0082794 A1* | 4/2006 | Simske | .............. | H04N 1/40068 358/1.2 |
| 2006/0210197 A1* | 9/2006 | Suenaga | ............ | G06K 9/00993 382/321 |
| 2008/0063276 A1* | 3/2008 | Vincent | ................ | G06K 9/6218 382/182 |
| 2008/0219543 A1* | 9/2008 | Csulits | ................... | G06K 9/033 382/135 |
| 2014/0164891 A1* | 6/2014 | Fan | ..................... | H04N 1/00968 715/205 |

(Continued)

FOREIGN PATENT DOCUMENTS

JP    2015146075    8/2015

*Primary Examiner* — Ming Y Hon
(74) *Attorney, Agent, or Firm* — JCIPRNET

(57) ABSTRACT

An information processing apparatus includes a processor configured to acquire image data from preprocessing, calculate information related to accuracy of a result of processing for each partial region of an image corresponding to the acquired image data, and notify the preprocessing of the calculated information related to the accuracy and information for specifying a corresponding partial region.

20 Claims, 21 Drawing Sheets

(56) References Cited

U.S. PATENT DOCUMENTS

| | | | |
|---|---|---|---|
| 2015/0281739 A1* | 10/2015 | Russell | G06K 9/6857 |
| | | | 382/182 |
| 2016/0078291 A1* | 3/2016 | Kim | G06F 3/04883 |
| | | | 382/164 |
| 2016/0259991 A1* | 9/2016 | George | G06K 9/00469 |
| 2016/0342852 A1* | 11/2016 | Blanchflower | G06K 9/18 |
| 2016/0371633 A1* | 12/2016 | Stout | G06K 17/0022 |
| 2018/0182086 A1* | 6/2018 | Ma | G06K 9/036 |
| 2019/0005627 A1* | 1/2019 | Nanaumi | G06T 7/75 |
| 2019/0114313 A1* | 4/2019 | Roebuck | G06F 40/174 |
| 2020/0134309 A1* | 4/2020 | Misawa | G06T 5/002 |
| 2020/0134349 A1* | 4/2020 | Nagoya | G06K 9/2081 |

\* cited by examiner

FIG. 5

QUOTATION DOCUMENT

TO ABC INDUSTRY

XYZ TRADING

TABLE A

| ORDER PLACER | QUOTATION DATE | PRODUCT NAME | AMOUNT OF MONEY |
|---|---|---|---|
| FUJI TARO | 02242015 | SCANNER | 10,000 |
| FUJI HANAKO | 03062015 | MOUSE | 6,000 |

TABLE B

| DATE | RESPONSIBLE PERSON | PURCHASED PRODUCT | AMOUNT OF MONEY |
|---|---|---|---|
| 3/1 | FUJI TARO | PC MAIN BODY | 50,000 YEN |
| | | MONITOR | 20,000 YEN |
| 3/3 | FUJI HANAKO | SMARTPHONE | 40,000 YEN |

TOTAL AMOUNT OF MONEY 16,000 YEN

EXAMPLE: CASE WHERE REGION IS TABLE

| COMBINATION (FOR EACH REGION) | CERTAINTY DEGREE OF FIRST ROW | CERTAINTY DEGREE OF SECOND ROW | CERTAINTY DEGREE OF THIRD ROW |
|---|---|---|---|
| COMBINATION 1 | HIGH | HIGH | HIGH |
| COMBINATION 2 | HIGH | HIGH | LOW |
| COMBINATION 3 | HIGH | LOW | HIGH |
| COMBINATION 4 | HIGH | LOW | LOW |
| COMBINATION 5 | LOW | HIGH | HIGH |
| COMBINATION 6 | LOW | HIGH | LOW |
| COMBINATION 7 | LOW | LOW | HIGH |
| COMBINATION 8 | LOW | LOW | LOW |

| COMBINATION (FOR EACH REGION) | CERTAINTY DEGREE OF FIRST ROW | CERTAINTY DEGREE OF SECOND ROW | CERTAINTY DEGREE OF THIRD ROW |
|---|---|---|---|
| COMBINATION 1 | HIGH | HIGH | HIGH |
| COMBINATION 2 | HIGH | HIGH | LOW |
| COMBINATION 3 | HIGH | LOW | HIGH |
| COMBINATION 4 | HIGH | LOW | LOW |
| COMBINATION 5 | LOW | HIGH | HIGH |
| COMBINATION 6 | LOW | HIGH | LOW |
| COMBINATION 7 | LOW | LOW | HIGH |
| COMBINATION 8 | LOW | LOW | LOW |

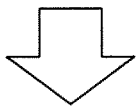

(B)

| COMBINATION (FOR EACH REGION) | ESTIMATED CAUSE |
|---|---|
| COMBINATION 1 | - |
| COMBINATION 2 | CELLS OF VALUES HAVE COLORED BACKGROUNDS |
| COMBINATION 3 | SAME AS ABOVE |
| COMBINATION 4 | ONLY CELLS OF VALUES ARE SHADED |
| COMBINATION 5 | CELLS OF ITEM NAMES HAVE WHITE TEXTS |
| COMBINATION 6 | CELLS OF ITEM NAMES HAVE WHITE TEXTS AND CELLS OF VALUES HAVE COLORED BACKGROUNDS |
| COMBINATION 7 | SAME AS ABOVE |
| COMBINATION 8 | ENTIRE SURFACE HAS GROUND TINT OR ENTIRE SURFACE HAS COLORED BACKGROUND, EACH TEXT IS COLORED TEXT, AND LIKE |

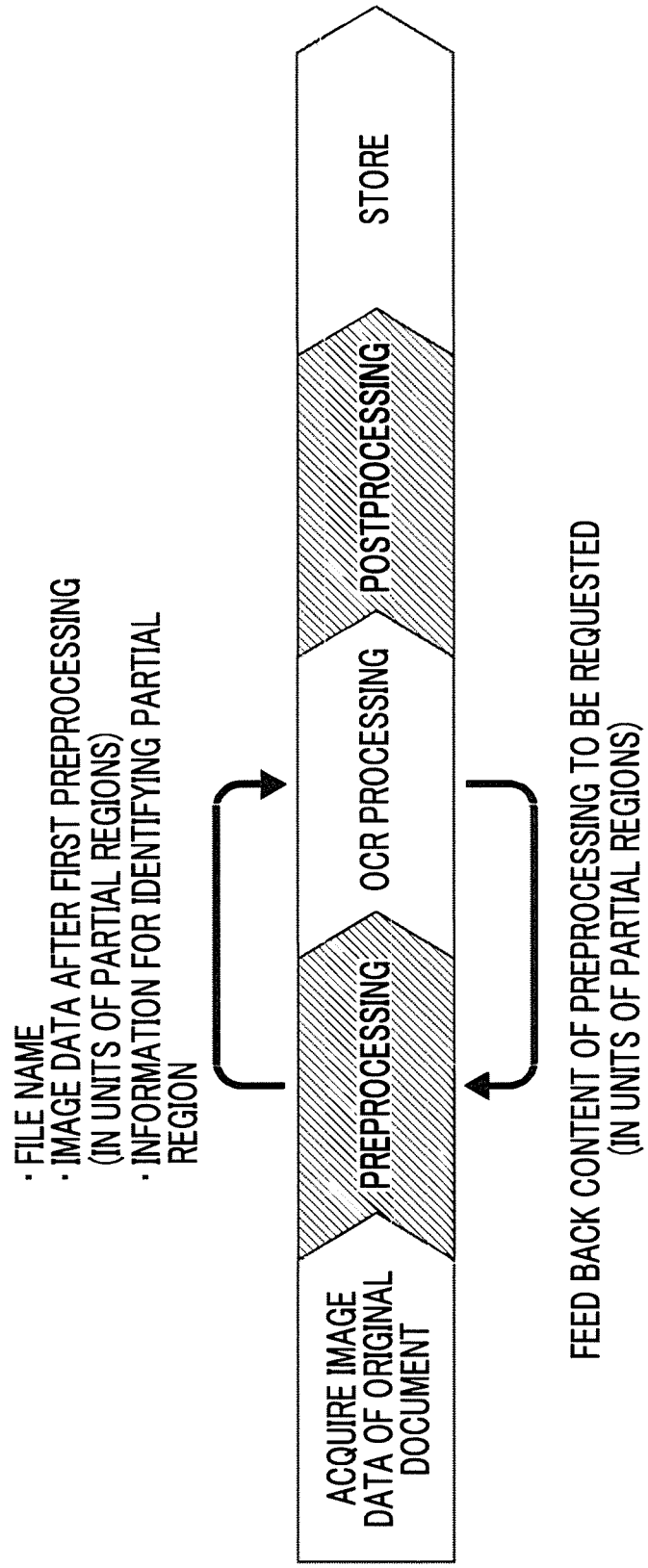

INFORMATION PROCESSING APPARATUS CALCULATING FEEDBACK INFORMATION FOR PARTIAL REGION OF IMAGE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-021692 filed Feb. 12, 2020.

BACKGROUND

(i) Technical Field

The present invention relates to an information processing apparatus and a non-transitory computer readable medium storing a program.

(ii) Related Art

A technology for converting an image of a text printed on printed matter or a handwritten text into a text code usable by a computer is known. This technology is referred to as optical character recognition (OCR) processing. Acquisition of an image corresponding to a document including a text uses a so-called scanner or a digital camera.

While image data imaged by the scanner or the digital camera may be directly output to the OCR processing, processing may be applied in advance in order to increase a value (hereinafter, referred to as a "certainty degree") indicating the certainty of a result of recognition of the text by the OCR processing. For example, cleansing processing of removing a noise, a ground tint, or the like included in the image may be executed before the OCR processing. Besides, the resolution of the image at the time of acquisition may be set to be high. Hereinafter, the processing executed before the OCR processing will be referred to as preprocessing.

SUMMARY

Currently, the cleansing processing is executed in units of entire images. The certainty degree of the OCR processing is also calculated in units of entire images or entire data files which are processing targets. Thus, even in a case where a region in which the certainty degree of the OCR processing is decreased is included, a result of processing including the region having a low certainty degree is passed to further downstream processing in a case where the certainty degree as a whole is high. Thus, in a case where important information is included in the region having a low certainty degree, there is a possibility of an effect of decreasing the accuracy of the downstream processing.

Aspects of non-limiting embodiments of the present disclosure relate to an information processing apparatus and a non-transitory computer readable medium storing a program that reduce an effort of correction with respect to a result of processing compared to a case of not notifying processing on a front stage side of information related to the result of processing related to a partial region.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire image data from preprocessing, calculate information related to accuracy of a result of processing for each partial region of an image corresponding to the acquired image data, and notify the preprocessing of the calculated information related to the accuracy and information for specifying a corresponding partial region.

BRIEF DESCRIPTION OF THE DRAWINGS

Exemplary embodiment(s) of the present invention will be described in detail based on the following figures, wherein:

FIG. 5 is a diagram for describing one example of an original document to be set as a reading target by an image processing apparatus;

FIG. 7 is a diagram for describing a relationship between a certainty degree calculated for one table region and a threshold value;

FIG. 14 is a diagram for describing examples of causes estimated in a case where target data is a table region;

FIG. 15 is a diagram for describing a summary of processing executed in Exemplary Embodiment 5;

DETAILED DESCRIPTION

Hereinafter, exemplary embodiments of the present invention will be described.

Exemplary Embodiment

System Configuration

Figure 1:
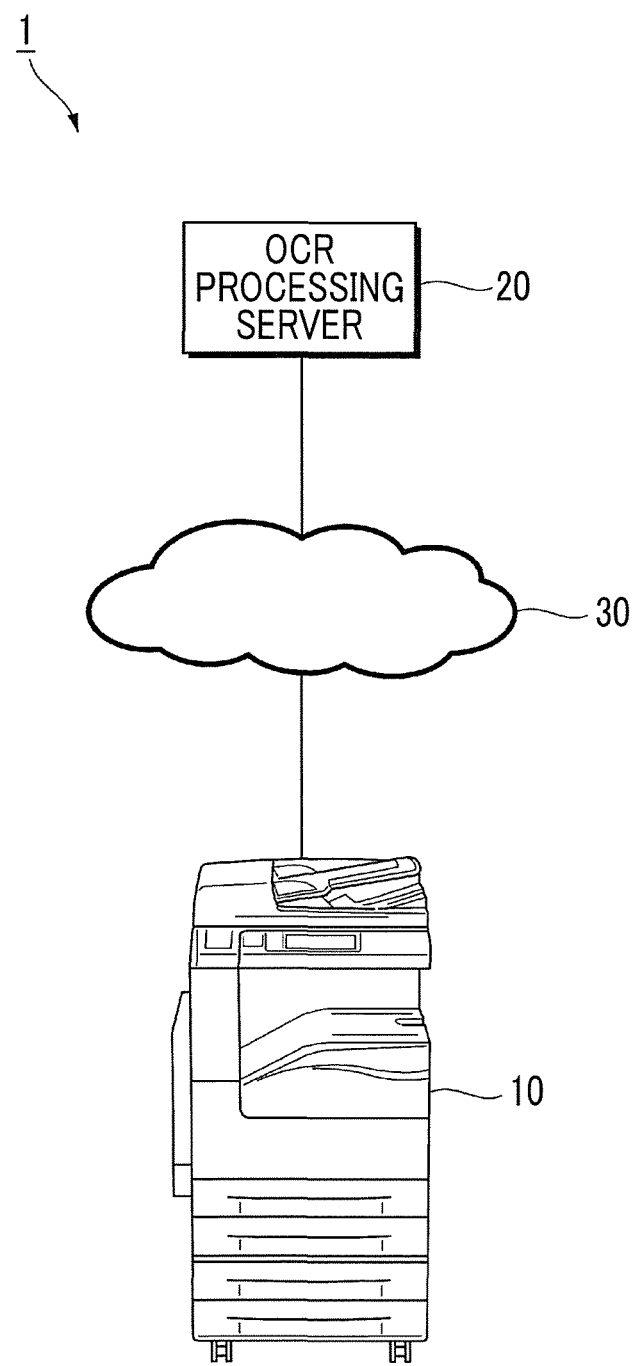
FIG. 1 is a diagram illustrating a configuration example of an information processing system used in an exemplary embodiment.

FIG. 1 is a diagram illustrating a configuration example of an information processing system 1 used in an exemplary embodiment.

An information processing system 1 illustrated in FIG. 1 includes an image processing apparatus 10, an OCR processing server 20 recognizing a text included in image data provided from the image processing apparatus 10, and a cloud network 30 as a network environment.

The image processing apparatus 10 in this exemplary embodiment has a function of generating a duplicate of an original document, a function of printing a document or an image on paper, a function of generating image data by optically reading the original document, a function of transmitting and receiving a facsimile, and the like.

A mechanism that transports the original document one sheet at a time to a position at which information is optically read is provided in an upper portion of a main body of the image processing apparatus 10 illustrated in FIG. 1. For example, this type of mechanism is referred to as an auto document feeder (ADF). The ADF is used for reading the original document to be duplicated or the original document to be transmitted by facsimile.

The function of printing the document or the image on paper is also used in generation of the duplicate. Data of the document or the image is optically read in the image processing apparatus 10 or is also provided from a recording medium connected to the main body or an external information terminal.

Functions provided in the image processing apparatus 10 are not limited to the above functions. In the case of this exemplary embodiment, any other functions may be provided in the image processing apparatus 10 as long as the function of generating the image data by optically reading information about the original document is provided.

The original document in this exemplary embodiment may be paper on which a text or an image is printed or may also be a document or an image in which a text is written by handwriting. The text may be written by handwriting in a part of the document or the image. That is, not all texts in the document need to be handwritten.

In this exemplary embodiment, a handwritten form such as an application document, an invoice document, a delivery document, or a voucher is considered as a handwritten document. In the handwritten form, the text is written in a box that is printed in advance. The handwritten document is not limited to types of forms and may be a contact memo, a circulation document, a postcard, a sealed letter, or the like.

A function of removing a noise, a ground tint, or the like from the image read from the original document is also prepared in the image processing apparatus 10 in this exemplary embodiment. In the case of this exemplary embodiment, the image data after the noise or the like is removed is transmitted to the OCR processing server 20.

While only one image processing apparatus 10 is illustrated in FIG. 1, a plurality of image processing apparatuses 10 constituting the information processing system 1 may be present. The image processing apparatus 10 in this exemplary embodiment is one example of an external apparatus.

The OCR processing server 20 in this exemplary embodiment is designed to perform OCR processing on the image data provided from the image processing apparatus 10 and pass text data that is a result of processing to the image processing apparatus 10. The image processing apparatus 10 to which the text data is passed executes postprocessing on the received text data. For example, the postprocessing includes language processing, processing of linking the text data to a correct position in terms of management, searching of a document related to the text data, and searching of a path to be used for delivering a product. A content of the postprocessing is designed in accordance with a content of the original document to be read or a content of required processing.

Besides, a function of feeding back information related to the certainty degree of the result of the OCR processing to the preprocessing for each partial region is also provided in the OCR processing server 20 in this exemplary embodiment. This function is provided in order to increase the certainty of the result of recognition of the text obtained by the OCR processing or increase the quality or accuracy of the result of the postprocessing.

The OCR processing server 20 in this exemplary embodiment is one example of an information processing apparatus.

An operator of the image processing apparatus 10 and an operator of the OCR processing server 20 in this exemplary embodiment may be the same or different.

While the OCR processing server 20 specialized in the OCR processing is used in this exemplary embodiment, a general-purpose server supporting a plurality of functions may be used. A computer executing the OCR processing is not limited to a server. For example, the computer executing the OCR processing may be a desktop computer or a laptop computer or may be a smartphone or a tablet terminal.

While one OCR processing server 20 is present in the case of FIG. 1, a plurality of OCR processing servers 20 constituting the information processing system 1 may be present. The plurality of OCR processing servers 20 may process one image data in a distributed manner.

While the cloud network 30 is used in communication between the image processing apparatus 10 and the OCR processing server 20 in the case of this exemplary embodiment, the invention is not limited to communication through the cloud network 30. For example, a local area network (LAN) or a mobile communication system abbreviated to 4G or 5G may be used in communication between the image processing apparatus 10 and the OCR processing server 20.

Configuration of OCR Processing Server

Figure 2:
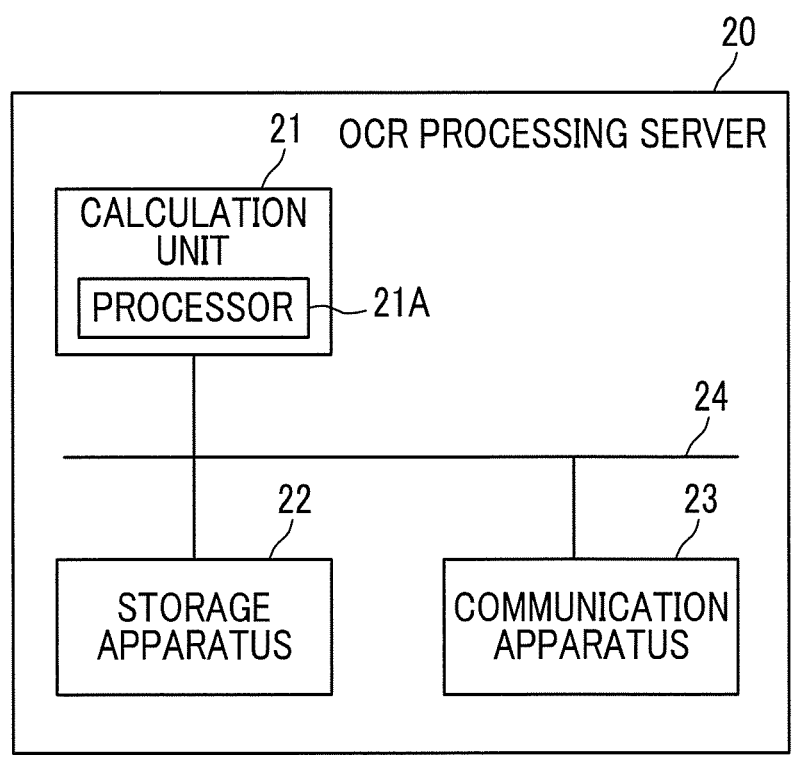
FIG. 2 is a diagram for describing one example of a hardware configuration of an OCR processing server used in Exemplary Embodiment 1.

FIG. 2 is a diagram for describing one example of a hardware configuration of the OCR processing server 20 used in Exemplary Embodiment 1. The OCR processing server 20 illustrated in FIG. 2 includes a calculation unit 21 executing the OCR processing, a storage apparatus 22 storing the image data and the like acquired from the image processing apparatus 10, and a communication apparatus 23 used for external communication. A reception apparatus receiving an instruction of a user or a display apparatus presenting information to the user may be connected to the OCR processing server 20. The calculation unit 21 and each unit are connected through a bus 24 and a signal line, not illustrated.

The calculation unit 21 in this exemplary embodiment includes a processor 21A, a read only memory (ROM), not illustrated, storing basic software, a basic input output system (BIOS), and the like, and a random access memory (RAM), not illustrated, used as a work area. The calculation unit 21 functions as a so-called computer. The OCR processing is implemented through execution of a program by the processor 21A.

The storage apparatus 22 is configured with a hard disk apparatus, a non-volatile rewritable semiconductor memory, or the like. For example, the storage apparatus 22 stores the image data acquired from the image processing apparatus 10, the text data obtained by the OCR processing, and the like. The storage apparatus 22 may store application programs.

The communication apparatus 23 is configured with a module complying with a wired or wireless communication standard. For example, an Ethernet (registered trademark) module, a universal serial bus (USB), a wireless LAN, or a facsimile modem is used in the communication apparatus 23.

Content of Processing

Hereinafter, processing executed by cooperation between the image processing apparatus 10 and the OCR processing server 20 will be described.

Summary of Processing

Figure 3:
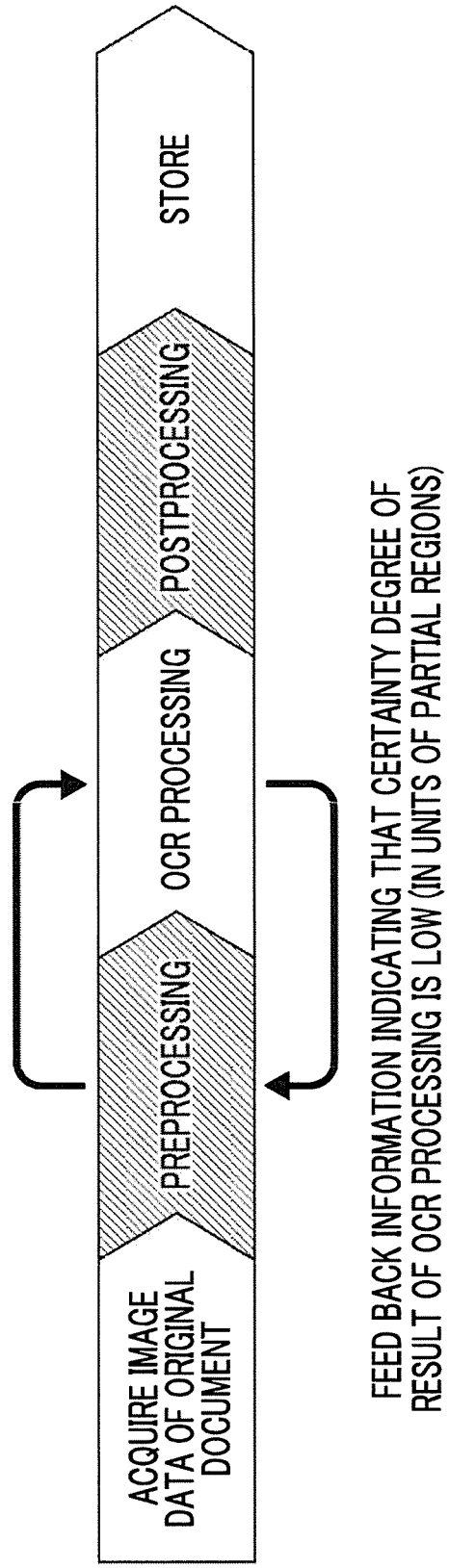
FIG. 3 is a diagram for describing a summary of processing executed in Exemplary Embodiment 1.

FIG. 3 is a diagram for describing a summary of processing executed in Exemplary Embodiment 1. The processing in this exemplary embodiment is configured with five types of processing. The five types of processing include processing of acquiring the image data of the original document, the preprocessing with respect to the acquired image data, the OCR processing with respect to the image data after the preprocessing, the postprocessing of processing the text data which is the result of the OCR processing, and processing of storing the result of the postprocessing in the storage apparatus 22 (refer to FIG. 2).

In the case of this exemplary embodiment, the OCR processing server 20 (refer to FIG. 1) executes the OCR processing, and the image processing apparatus 10 (refer to FIG. 1) executes the other four types of processing. In the case of this exemplary embodiment, of the preprocessing performed on the image data by the image processing apparatus 10, the preprocessing performed on the image data before the OCR processing is referred as a first preprocessing and the preprocessing performed in accordance with a feedback from a processing apparatus such as the OCR processing server 20, which performs a processing after the image processing apparatus 10, is referred as a second preprocessing.

In the case of this exemplary embodiment, cleansing processing of removing a noise, a ground tint, or the like and processing of separating into objects are executed as the preprocessing. Processing of extracting a value corresponding to a key or the key corresponding to the value by referring to a dictionary in which combinations of the key and the value are registered is executed as the postprocessing. A text or an image corresponds to the key and the value in this exemplary embodiment. For example, in a case where the key is a name, Fuji Taro corresponds to the value. In other words, the key is a text or a figure indicating an item, and the value is a text or a figure indicating a specific content corresponding to the item.

In the case of this exemplary embodiment, information for specifying a processing target between the preprocessing and the OCR processing is notified to the OCR processing from the preprocessing. In the case of FIG. 3, a file name is notified as the information for specifying the processing target is notified as data attached to the image data after the preprocessing. In the case of this exemplary embodiment, the file name is configured with a date and time of reading or a user name performing a reading work, information for distinguishing the image processing apparatus 10 used in reading, and the like. Information for specifying the file name is not limited to this exemplary embodiment.

The OCR processing clearly indicates the processing target using, for example, the file name in feeding back of information to the preprocessing. Notification of the file name enables cooperation between the preprocessing and the OCR processing. For example, in a case where the preprocessing and the OCR processing process a plurality of pieces of image data in parallel, the processing target may be distinguished using the file name. As long as the processing target may be specified, information notified to the OCR processing from the preprocessing is not limited to the file name.

In the case of this exemplary embodiment, processing of separating the image data into a plurality of objects is also executed in the preprocessing.

In the case of this exemplary embodiment, four objects including a region of a text (hereinafter, referred to as the "text region"), a region of a table (hereinafter, referred to as the "table region"), a region of graphics (hereinafter, referred to as the "graphics region"), and a region of a drawing (hereinafter, referred to as the "drawing region") are used.

For example, a region in which a title of the original document, a text, or a numerical value is included is cut out as the text region. A table or a caption attached to the table is cut out as the table region. A region in which a company name or the like is graphically illustrated is cut out as the graphics region or the drawing region. The other region is a background. Each individual object is one example of the partial region.

The background, the graphics region, and the drawing region are excluded from the target of the OCR processing. Thus, image data corresponding to the text region and the table region is transmitted to the OCR processing server 20 from the image processing apparatus 10 as target data. Information for identifying each individual partial region is assigned to each target data.

For example, coordinates or a serial number indicating a position in the image data in which the original document is imaged is used in the information for identifying the partial region. For example, the coordinates are provided as one or a plurality of coordinate points prescribing outer edges of the region. In a case where the partial region has a rectangular shape, for example, a coordinate point at an upper left corner of the partial region is used.

In the case of this exemplary embodiment, the image data after the preprocessing is transmitted to the OCR processing from the preprocessing in units of partial regions.

Besides, information for specifying the content of the executed preprocessing may be notified to the OCR processing from the preprocessing. The content of the preprocessing may be used for estimating a cause of a low certainty degree on the side of the OCR processing.

In the case of this exemplary embodiment, information indicating that the certainty degree of the result of the OCR processing is low is fed back to the preprocessing from the OCR processing. The certainty degree is one example of information related to accuracy.

In the case of this exemplary embodiment, the partial region is used in the meaning of each individual region cut out as an object. In other words, in a case where a plurality of text regions are present, there is a possibility that different information is fed back for each text region. The same applies to the table region. For the table region, there is a possibility that different information is fed back in units of rows or columns.

In the case of this exemplary embodiment, information for identifying each individual partial region is notified to the OCR processing from the preprocessing. Accordingly, feedback to the preprocessing from the OCR processing includes information for identifying each individual partial region. In the OCR processing, the certainty degree may be calculated by regarding a plurality of partial regions having the same type of object as one partial region, and information indicating that the certainty degree is low may be fed back together with information for identifying the plurality of partial regions of which the certainty degree is calculated.

In the case of this exemplary embodiment, feedback for the partial region having a certainty degree higher than a predetermined threshold value is not executed. Accordingly, in a case where each individual certainty degree of all partial regions exceeds the predetermined threshold value, feedback to the preprocessing from the OCR processing is not executed. The reason is that the text data having a high certainty degree is obtained.

In this exemplary embodiment, the certainty degree of the partial region is obtained as an average value of the certainty degrees calculated for each individual text extracted from the corresponding partial region. The text here includes numbers and symbols. The average value may be calculated using different weighting for each partial region. For example, different weights may be used between the case of the text region and the case of the table region.

The threshold value used for evaluating the certainty degree of the partial region may be different or the same for each type of object to which the partial region corresponds. For example, the certainty degree may be calculated using different weights between the text region and the table region. In addition, even in the partial regions of the same type, different weights may be used between a title part and a body text.

Feedback to the preprocessing from the OCR processing may be feedback without designating the partial region. Even in this case, the OCR processing recognizes which partial region has a high certainty degree and which partial region has a low certainty degree.

Accordingly, the OCR processing may recognize a change in certainty degree by selecting the partial region having a low certainty degree in the previous OCR processing from the image data to which new preprocessing is applied. The OCR processing may also selectively output only the text data for which the certainty degree higher than the threshold value is obtained to the postprocessing.

Processing Executed by OCR Processing Server

Figure 4:
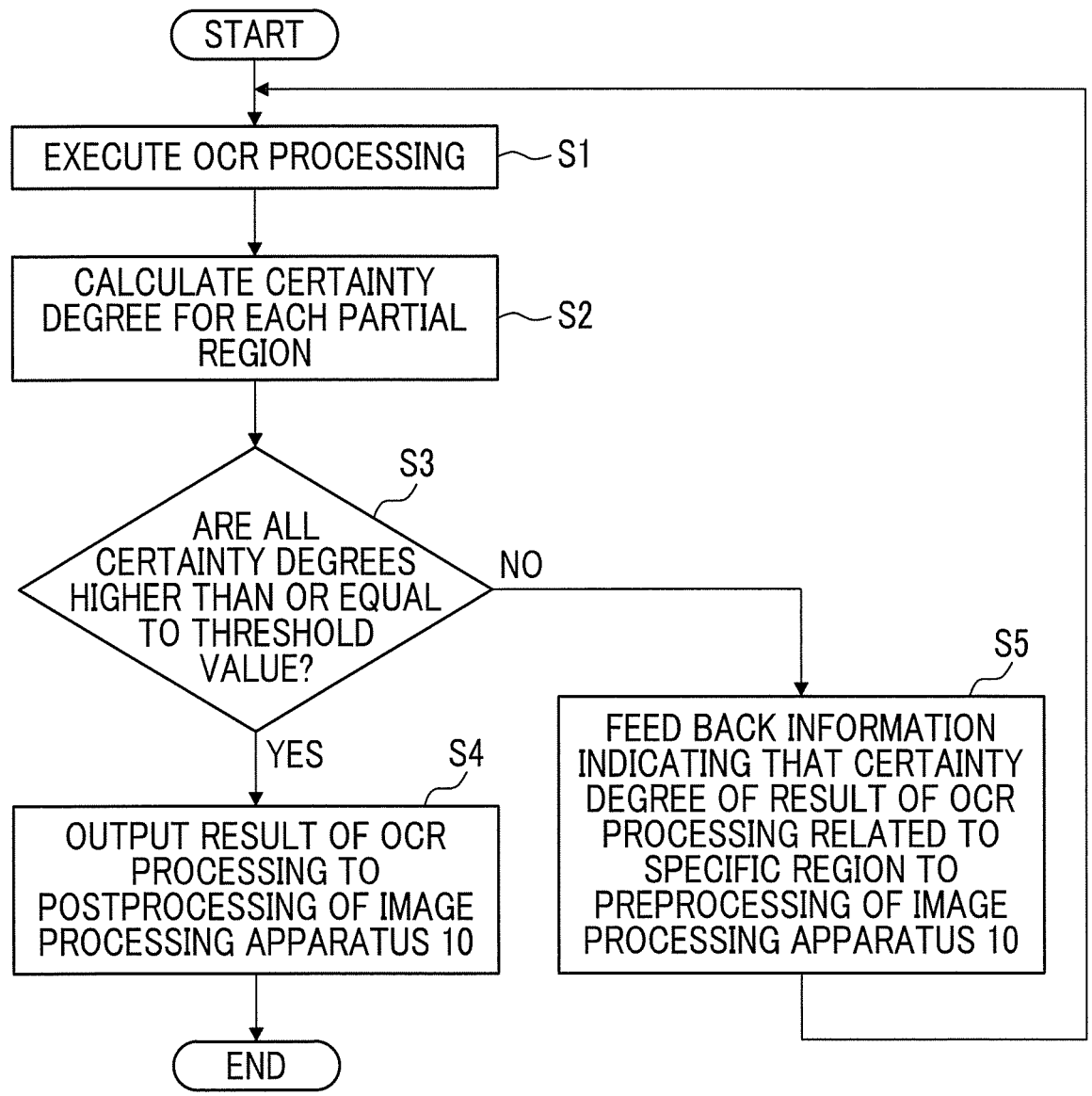
FIG. 4 is a flowchart for describing one example of processing executed by the OCR processing server in Exemplary Embodiment 1.

FIG. 4 is a flowchart for describing one example of processing executed by the OCR processing server 20 in Exemplary Embodiment 1. Symbol S illustrated in the drawing denotes a step. The processing illustrated in FIG. 4 is executed by the processor 21A (refer to FIG. 2).

In the case of this exemplary embodiment, the processing illustrated in FIG. 4 is started by receiving the image data after the preprocessing from the image processing apparatus 10 that receives a reading instruction of the original document accompanying the OCR processing. Each individual image data corresponds to each individual partial region determined as the text region or the table region. Information for identifying the partial region is assigned to each individual image data.

First, the original document that is a source of the image data to be set as a processing target by the OCR processing server 20 will be described.

FIG. 5 is a diagram for describing one example of the original document to be set as a reading target by the image processing apparatus 10. The title of the original document illustrated in FIG. 5 is quotation document, and a ground tint is provided on the entire paper. The quotation document illustrated in FIG. 5 includes two tables. An upper part is Table A, and a lower part is Table B. Both of Table A and Table B illustrated in FIG. 5 are configured with three rows. All item names in which field headings of Table A and Table B are written are printed with white texts in a black background. In the second row and the third row of Table A, black texts are printed in a white background. In the second row and the third row of Table B, texts are printed in a colored background. The texts may be any of black texts, white texts, and colored texts. A case where the background is shaded is also considered.

Figure 6:
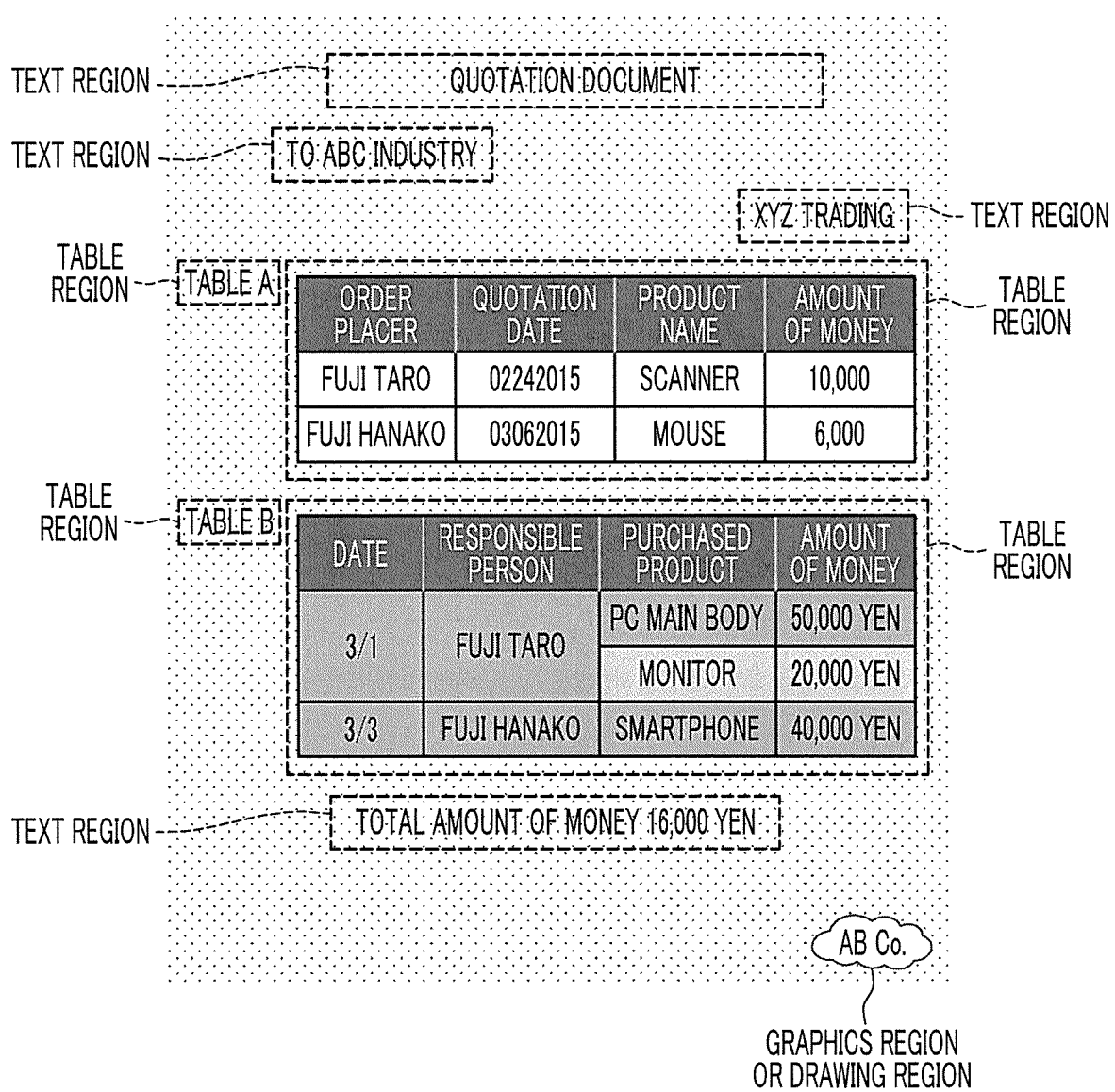
FIG. 6 is a diagram for describing examples of objects separated from image data.

FIG. 6 is a diagram for describing examples of objects separated from the image data. In the case of FIG. 6, regions including character strings of "quotation document", "to ABC industry", "XYZ trading", and "total amount 16,000 yen" are separated from the image data as the text region. Regions including a table corresponding to the texts of Table A and a table corresponding to the texts of Table B are separated from the image data as the table region. A logo arranged lower right in the image data is separated from the image data as the graphics region or the drawing region.

The preprocessing may be before or after separation of the objects. In this exemplary embodiment, separation of the objects is executed after execution of the preprocessing.

FIG. 4 will be described again.

The processor 21A receiving the image data corresponding to each individual partial region determined as the text region or the table region performs the OCR processing for each image data corresponding to each individual partial region (step S1). The text data is extracted from each individual image data by the OCR processing.

In the case of this exemplary embodiment, the cleansing processing of removing the noise, the ground tint, or the like is already executed as the preprocessing on the image data which is the target of the OCR processing. However, the content of the cleansing processing is not guaranteed to match the actual content of the partial region.

Information for identifying each region is assigned to each partial region. This information for identifying the partial region is also linked to the extracted text data.

Next, the processor 21A calculates the certainty degree for each partial region (step S2). For example, the certainty degree is calculated in units of individual partial regions corresponding to the text regions or individual partial regions corresponding to the table regions. The certainty degree may also be calculated in units of regions into which the partial region is further divided. For example, the certainty degree may be calculated in units of rows or units of columns.

Next, the processor 21A determines whether or not all calculated certainty degrees are higher than or equal to the threshold value (step S3). As described above, the threshold value may be different or the same for each type of object to which the partial region corresponds.

FIG. 7 is a diagram for describing a relationship between the certainty degree calculated for one table region and the threshold value. In the example illustrated in FIG. 7, the certainty degree is calculated for each row constituting the table. One calculated certainty degree and the threshold value may also be compared without distinguishing the rows.

In the example illustrated in FIG. 7, Table A or Table B in FIG. 5 is considered. Thus, the number of rows is three. In the case of FIG. 7, eight combinations of certainty degrees are present for one table region. These combinations are represented by Combinations 1 to 8 in FIG. 7. The number of combinations depends on the number of rows constituting the table region or the number of certainty degrees notified for one table region.

In a case where the background color of Table A or Table B varies between even-numbered rows and odd-numbered rows like the background color of each row corresponding to Combinations 1 to 8 in FIG. 7, the certainty degree may be calculated in units of odd-numbered rows and even-numbered rows even in a case where the number of rows is increased.

Combination 1 is a case where each certainty degree corresponding to the first row to the third row is higher than the threshold value.

Combination 2 is a case where each certainty degree corresponding to the first row and the second row is higher than the threshold value and the certainty degree corresponding to the third row is lower than the threshold value.

Combination 3 is a case where each certainty degree corresponding to the first row and the third row is higher than the threshold value and the certainty degree corresponding to the second row is lower than the threshold value.

Combination 4 is a case where the certainty degree corresponding to the first row is higher than the threshold value and each certainty degree corresponding to the second row and the third row is lower than the threshold value.

Combination 5 is a case where each certainty degree corresponding to the second row and the third row is higher than the threshold value and the certainty degree corresponding to the first row is lower than the threshold value.

Combination 6 is a case where the certainty degree corresponding to the second row is higher than the threshold value and each certainty degree corresponding to the first row and the third row is lower than the threshold value.

Combination 7 is a case where the certainty degree corresponding to the third row is higher than the threshold value and each certainty degree corresponding to the first row and the second row is lower than the threshold value.

Combination 8 is a case where each certainty degree corresponding to the first row to the third row is lower than the threshold value.

FIG. 4 will be described again.

In a case where a positive result is obtained in step S3, the processor 21A outputs the result of the OCR processing to the postprocessing of the image processing apparatus 10 (step S4). The reason is that in a case where a positive result is obtained in step S3, the certainty degrees of all regions are higher than the threshold value, and the preprocessing does not need to be re-executed.

In a case where a negative result is obtained in step S3, the processor 21A feeds back information indicating that the certainty degree of the result of the OCR processing related to a specific region is low to the preprocessing of the image processing apparatus 10 (step S5). A low certainty degree means that the certainty degree is lower than the threshold value.

The feedback here also includes information for identifying the partial region having a low certainty degree. The information for identifying the partial region is needed in the case of limiting re-execution of the preprocessing to the specific partial region.

While information indicating that the certainty degree of the entire table region is low may be fed back in the feedback to the preprocessing, information indicating that the certainty degree is low may be fed back by designating a row constituting the table region as illustrated in FIG. 7. By designating a range narrower than the partial region as a region having a low certainty degree, accuracy in the case of estimating the cause of decrease in certainty degree of the result of the OCR processing is improved.

Even in a case where only information indicating the partial region having a low certainty degree is fed back, an estimation that the certainty degrees of other regions that are not notified are high can be made on the preprocessing side.

After execution of step S5, the processor 21A returns to step S1. Specifically, a state of waiting for reception of the image data on which the preprocessing is re-executed is set. The above processing is repeated until a positive result is obtained in step S3.

In this exemplary embodiment, while the partial region of which the calculated certainty degree is lower than the predetermined threshold value is included, inclusion of the partial region is fed back to the preprocessing. In the preprocessing that receives feedback of information indicating that the certainty degree is low, the preprocessing with a content different from previous execution may be selectively executed, and newly obtained image data may be provided to the OCR processing again. By changing the content of the preprocessing, a possibility of obtaining the certainty degree higher than the threshold value is increased.

In the case of this exemplary embodiment, only the fact that a low certainty degree is obtained is fed back. Thus, the certainty degree of the result of the OCR processing performed on the image data after execution of the preprocessing with a different content does not necessarily exceed the threshold value. On the contrary, there is a possibility that the certainty degree is decreased from previous execution.

However, by repeating feedback of information indicating that the certainty degree is low, a possibility of obtaining a high certainty degree for all partial regions is increased. Consequently, the text data having a certainty degree higher than the threshold value is provided to the postprocessing executed by the image processing apparatus 10, and improvement in the accuracy or the reliability of the result of the postprocessing is implemented. In addition, reduction of an effort to manually check or manually correct the recognized text data is implemented.

While only the information about a low certainty degree is fed back in this exemplary embodiment, information indicating the partial region having a high certainty degree may be fed back together.

Exemplary Embodiment 2

Figure 8:
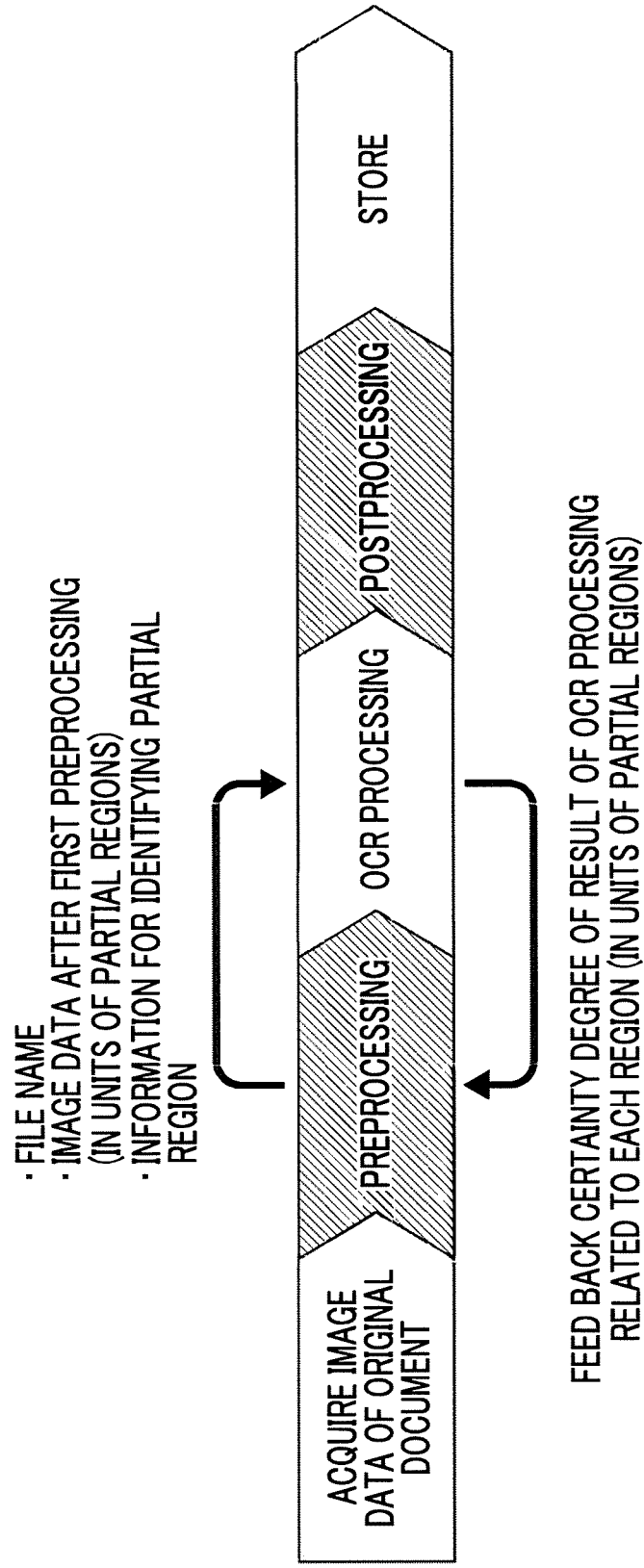
FIG. 8 is a diagram for describing a summary of processing executed in Exemplary Embodiment 2.

FIG. 8 is a diagram for describing a summary of processing executed in Exemplary Embodiment 2. In FIG. 8, parts corresponding to FIG. 3 are designated by corresponding reference signs.

In the case of this exemplary embodiment, the certainty degree calculated for each partial region is fed back to the preprocessing from the OCR processing.

Figure 9:
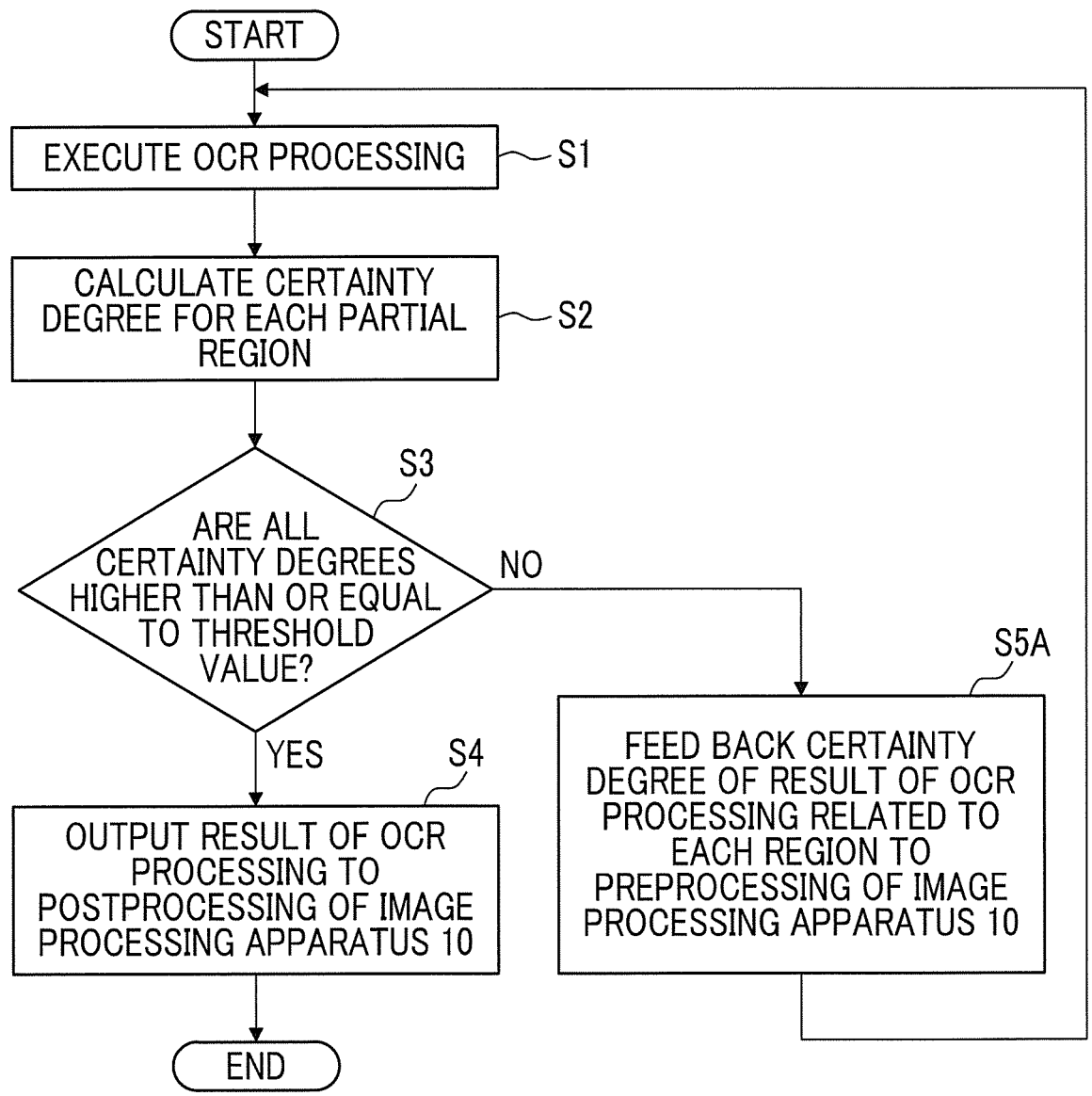
FIG. 9 is a flowchart for describing one example of processing executed by an OCR processing server in Exemplary Embodiment 2.

FIG. 9 is a flowchart for describing one example of processing executed by the OCR processing server 20 in Exemplary Embodiment 2. In FIG. 9, parts corresponding to FIG. 4 are designated by corresponding reference signs.

In the case of FIG. 9, the content of step S5A executed in a case where a negative result is obtained in step S3 is different from Exemplary Embodiment 1. While information indicating that the certainty degree of the result of the OCR processing related to a specific region is low is fed back in the case of Exemplary Embodiment 1, the certainty degree is fed back in the case of this exemplary embodiment.

Since the certainty degree is fed back, a determination as to whether or not the certainty degree is higher than the threshold value is executed even on the preprocessing side.

Exemplary Embodiment 3

Figure 10:
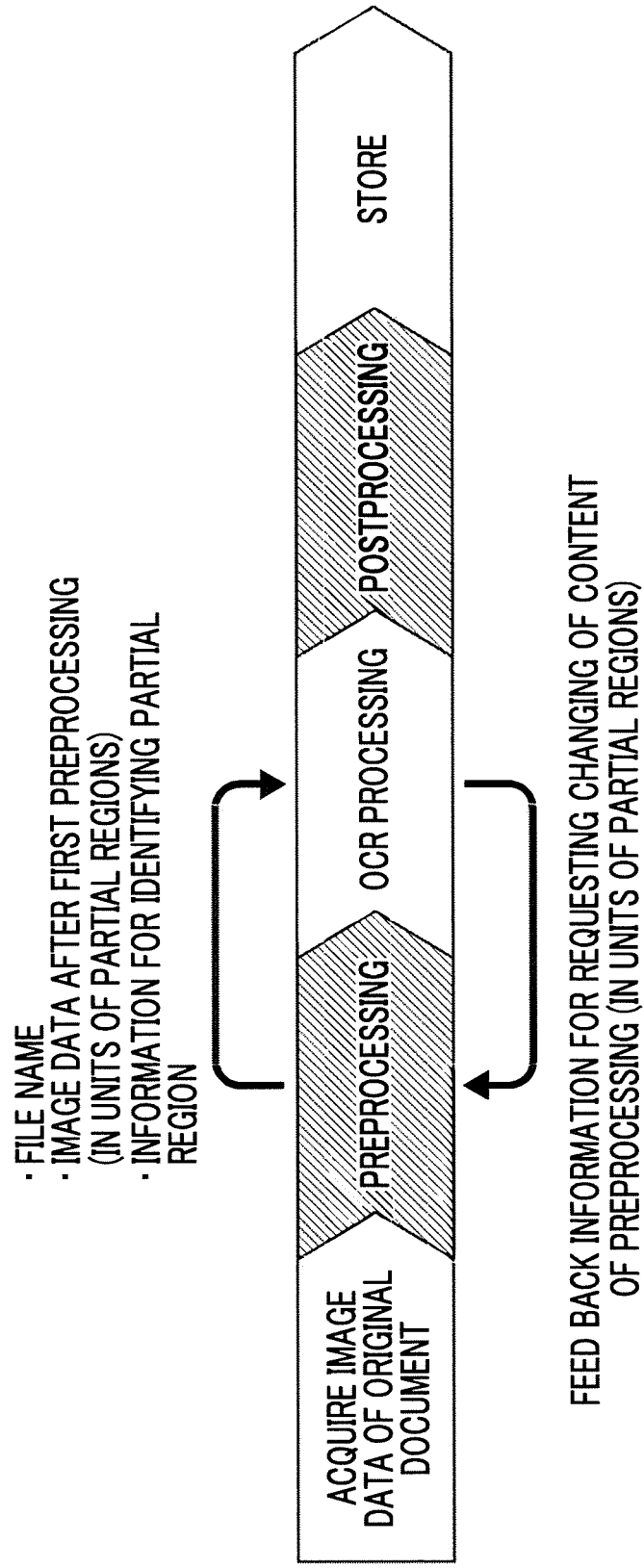
FIG. 10 is a diagram for describing a summary of processing executed in Exemplary Embodiment 3.

FIG. 10 is a diagram for describing a summary of processing executed in Exemplary Embodiment 3. In FIG. 10, parts corresponding to FIG. 3 are designated by corresponding reference signs.

In the case of this exemplary embodiment, information for requesting changing of the content of the preprocessing for a specific partial region is fed back to the preprocessing from the OCR processing.

Figure 11:
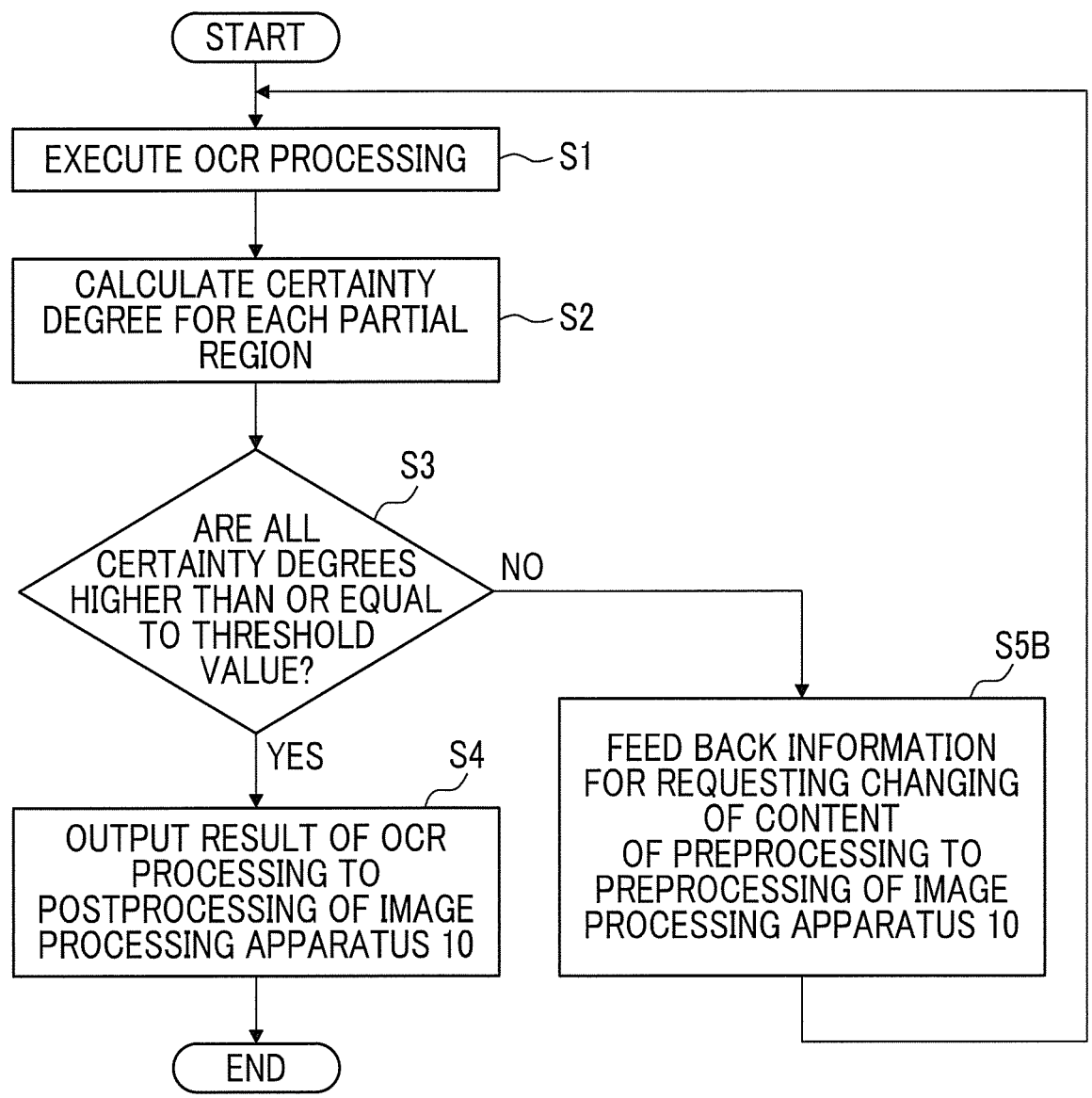
FIG. 11 is a flowchart for describing one example of processing executed by an OCR processing server in Exemplary Embodiment 3.

FIG. 11 is a flowchart for describing one example of processing executed by the OCR processing server 20 in Exemplary Embodiment 3. In FIG. 11, parts corresponding to FIG. 4 are designated by corresponding reference signs.

In the case of FIG. 11, the content of step S5B executed in a case where a negative result is obtained in step S3 is different from Exemplary Embodiment 1. While information indicating that the certainty degree of the result of the OCR processing related to a specific region is low is fed back in the case of Exemplary Embodiment 1, information for requesting changing of the content of the preprocessing is fed back in the case of this exemplary embodiment. While information about evaluation of the result of the OCR processing is fed back in the case of Exemplary Embodiments 1 and 2, a request for the preprocessing is fed back in this exemplary embodiment.

Exemplary Embodiment 4

Figure 12:
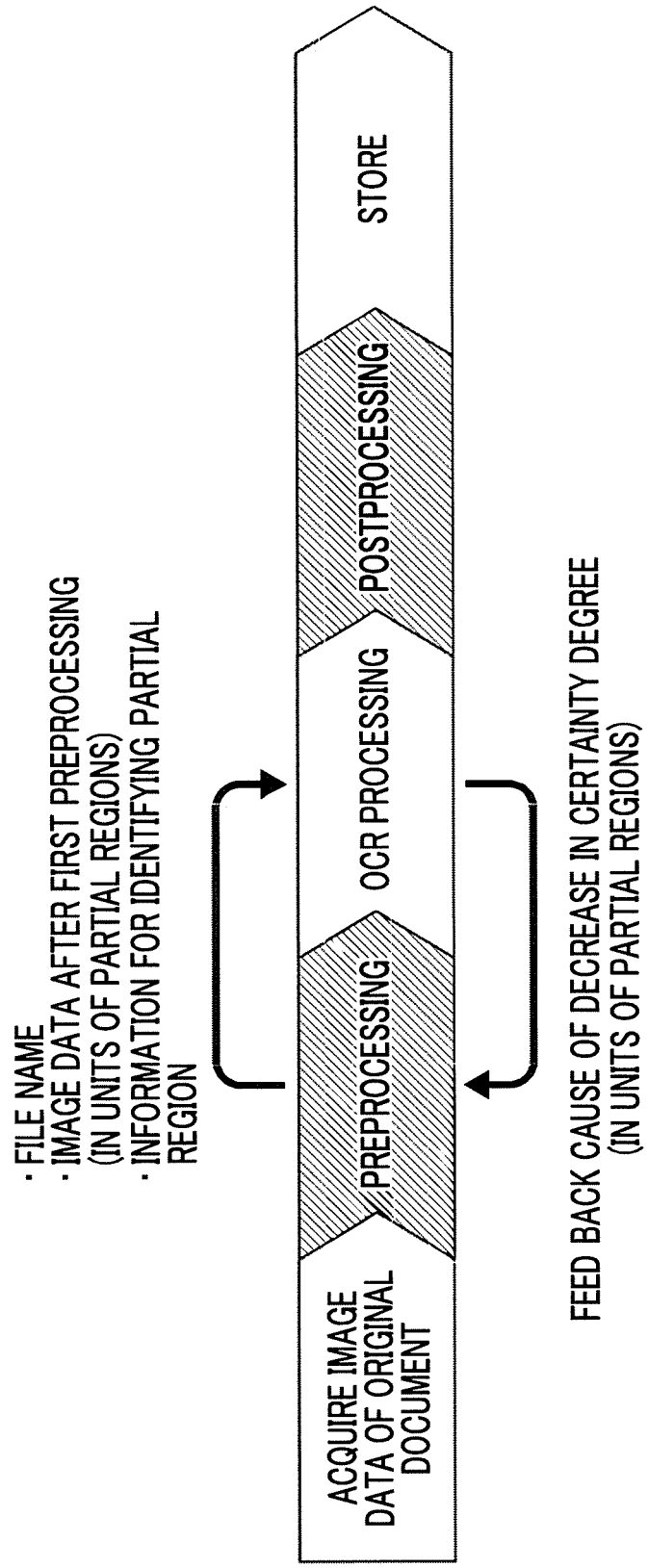
FIG. 12 is a diagram for describing a summary of processing executed in Exemplary Embodiment 4.

FIG. 12 is a diagram for describing a summary of processing executed in Exemplary Embodiment 4. In FIG. 12, parts corresponding to FIG. 3 are designated by corresponding reference signs.

In the case of this exemplary embodiment, the cause of decrease in certainty degree is fed back to the preprocessing from the OCR processing.

Figure 13:
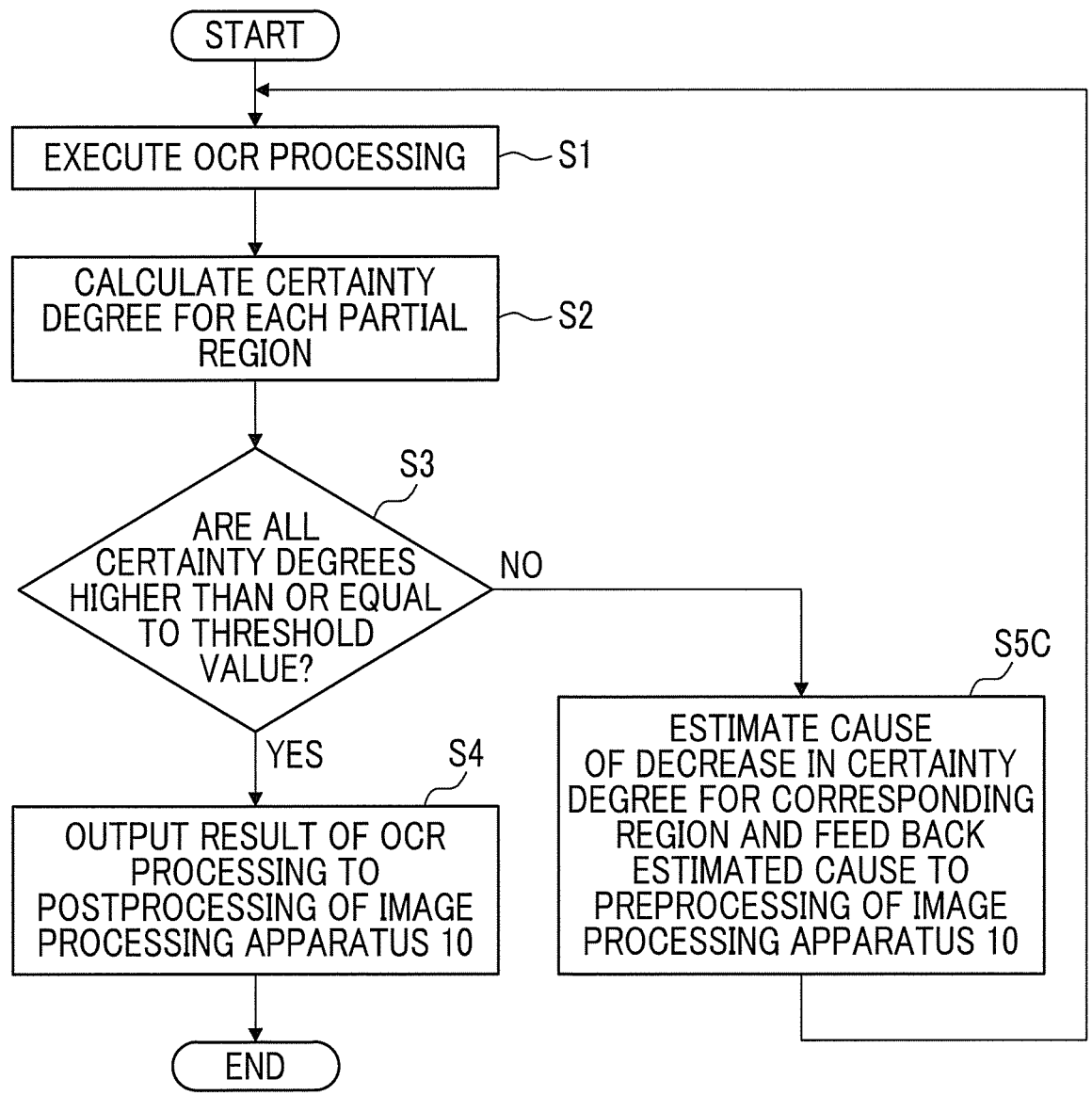
FIG. 13 is a flowchart for describing one example of processing executed by an OCR processing server in Exemplary Embodiment 4.

FIG. 13 is a flowchart for describing one example of processing executed by the OCR processing server 20 in Exemplary Embodiment 4. In FIG. 13, parts corresponding to FIG. 4 are designated by corresponding reference signs.

In the case of FIG. 13, the content of step S5C executed in a case where a negative result is obtained in step S3 is different from Exemplary Embodiment 1.

In a case where a negative result is obtained in step S3, the processor 21A in the case of this exemplary embodiment estimates the cause of decrease in certainty degree for the corresponding region and feeds back the estimated cause to the preprocessing of the image processing apparatus 10.

For example, the processor 21A reads information about whether or not the ground tint is present, whether or not the background is present, the size of a font, whether or not the stain is present, whether or not a crease is present, a relationship in color between the background and the text, the type of original document, and the like from the image data and uses the information in estimation of the cause.

In estimation in step S5C, a table of correspondence relationship prepared in advance, the learned model updated by machine learning, and a determination program may be used.

The table of correspondence relationship stores combinations of features acquired from the image data of the partial regions and the cause considered in a case where the certainty degree is low. The content of the preprocessing recommended for each combination may be stored.

In the case of using the learned model, the cause is output in a case where the image data corresponding to the partial regions is input into the learned model. In a case where the image data corresponding to the partial regions is input into the learned model, the content of the recommended preprocessing may be output.

In the case of using the determination program, the cause considered to decrease the certainty degree is output by performing branching based on individual determinations once or repeating the branching a plurality of times. Even in this case, the content of the recommended preprocessing may be output instead of the cause.

In the case of this exemplary embodiment, the image data of the partial region determined as having a low certainty degree and the cause estimated for the image data in the immediately previous execution are machine-learned as training data.

The unit of learning is not limited to the partial region and may be a unit of the type of object, a unit of the type of original document, or a unit of similar images.

Even in a case where the types of objects are the same, there is a possibility that the content of the preprocessing contributing to improvement in certainty degree varies in a case where the combination of the background and the text varies as in Table A and Table B in FIG. 5. Thus, machine learning is performed in units of partial regions in this exemplary embodiment.

In this exemplary embodiment, reinforcement learning is employed in machine learning. In reinforcement learning, learning progresses in order to increase a reward. Thus, no reward or a low reward is assigned to the content of the preprocessing obtaining only a certainty degree lower than the threshold value. A high reward is provided to the content of the preprocessing in a case where a certainty degree higher than the threshold value is obtained like a case where a positive result is obtained in step S3.

The result of machine learning is used in estimation of the cause of a low certainty degree in subsequent execution. In a case where the image data corresponding to the partial regions is provided to a learned model subjected to reinforcement learning, the cause of a low certainty degree in the partial region is output. Increasing the accuracy of reinforcement learning decreases the number of times of feedback. A possibility of increasing the certainty degree above the threshold value may be increased compared to the case of randomly requesting changing of the content of the preprocessing. The learning here may be performed either in units of partial regions, in units of objects, or for each type of original document to which the image data corresponds.

Besides, the certainty degree of the entire image data may be referred to in estimation of the cause. The certainty degree of the entire image data is calculated using all partial regions received for the same page as a target. The fact of being on the same page is included in information notified from the preprocessing.

For example, the certainty degree of the entire image data may be calculated using the total number of texts extracted from all partial regions received for the same page as a denominator and using the number of texts having a low certainty degree among the certainty degrees calculated for each text as a numerator.

For example, in a case where the certainty degree of the entire image data is high and only the certainty degree of a specific partial region is low, a cause specific to the specific partial region is considered. Meanwhile, in a case where the certainty degree of not only the specific partial region but also the entire image data is low, a common cause regardless of a difference between types of objects is estimated. For example, a possibility that the stain or the crease is the cause is estimated.

In a case where a history of the content of the preprocessing used for partial regions of the same or similar types and information related to the certainty degree is present, the cause may be estimated based on the content of the preprocessing when a high certainty degree is obtained. The content of the preprocessing needs to be notified to the OCR processing side from the preprocessing side, and the information needs to be stored in association with the image data corresponding to the partial region. The partial regions of the same or similar types mean that the content of the image data corresponding to the partial regions is of the same or similar types.

In a case where an irregular history of combinations of the estimated cause and the corresponding certainty degree is stored, the cause at the time of obtaining a high certainty degree may be used. In a case where the history of combinations of the content of preprocessing and the corresponding certainty degree is stored, an assumed cause may be estimated from the content of the preprocessing at the time of obtaining a high certainty degree.

Besides, in a case where a history of causes estimated for the partial regions of the same or similar types is present, the cause may be estimated by referring to the image data which is the current processing target and the history for the partial regions of the same or similar types.

FIG. 14 is a diagram for describing examples of causes estimated in a case where the target data is the table region. In FIG. 14, (A) illustrates a combination of certainty degrees calculated for one table region, and (B) illustrates the estimated causes. The example in FIG. 14 is an example in which the certainty degree is calculated for each row. In a case where the certainty degree is calculated in units of the entire table regions, detailed causes as illustrated in FIG. 14 may not be easily estimated. The table illustrated in (A) is the same as in FIG. 7.

Combination 1 is a case where each certainty degree corresponding to the first row to the third row is higher than the threshold value. In this case, the content of the immediately previously executed preprocessing does not pose problems. Thus, estimation of the cause of a low certainty degree is not needed.

Combination 2 is a case where each certainty degree corresponding to the first row and the second row is higher than the threshold value and the certainty degree corresponding to the third row is lower than the threshold value. In this case, an estimation that cells of values have colored backgrounds is made as the cause of decrease in certainty degree.

Combination 3 is a case where each certainty degree corresponding to the first row and the third row is higher than the threshold value and the certainty degree corresponding to the second row is lower than the threshold value. Even in this case, an estimation that the cells of values have colored backgrounds is made as the cause of decrease in certainty degree.

Combination 4 is a case where the certainty degree corresponding to the first row is higher than the threshold value and each certainty degree corresponding to the second row and the third row is lower than the threshold value. In this case, an estimation that only the cells of values are shaded is made as the cause of decrease in certainty degree. Shading here includes the ground tint.

Combination 5 is a case where each certainty degree corresponding to the second row and the third row is higher than the threshold value and the certainty degree corresponding to the first row is lower than the threshold value. In this case, an estimation that cells of item names have white texts is made as the cause of decrease in certainty degree.

Combination 6 is a case where the certainty degree corresponding to the second row is higher than the threshold value and each certainty degree corresponding to the first row and the third row is lower than the threshold value. In this case, an estimation that the cells of item names have white texts and the cells of values have colored backgrounds is made as the cause of decrease in certainty degree.

Combination 7 is a case where the certainty degree corresponding to the third row is higher than the threshold value and each certainty degree corresponding to the first row and the second row is lower than the threshold value. Even in this case, an estimation that the cells of item names have white texts and the cells of values have colored backgrounds is made as the cause of decrease in certainty degree.

Combination 8 is a case where each certainty degree corresponding to the first row to the third row is lower than the threshold value. In this case, an estimation that the entire surface has the ground tint or the entire surface has a colored background, each text is a colored text, and the like is made as the cause of decrease in certainty degree.

The above estimation focuses on original features on the image of the original document. Thus, estimation of a decrease in certainty degree caused by an effect of the stain, the crease, or the like needs another information. For example, information about the certainty degree in units of pages or the original image data is needed.

Exemplary Embodiment 5

FIG. 15 is a diagram for describing a summary of processing executed in Exemplary Embodiment 5. In FIG. 15, parts corresponding to FIG. 3 are designated by corresponding reference signs.

In the case of this exemplary embodiment, the content of the preprocessing to be requested for a specific partial region is fed back to the preprocessing from the OCR processing.

Figure 16:
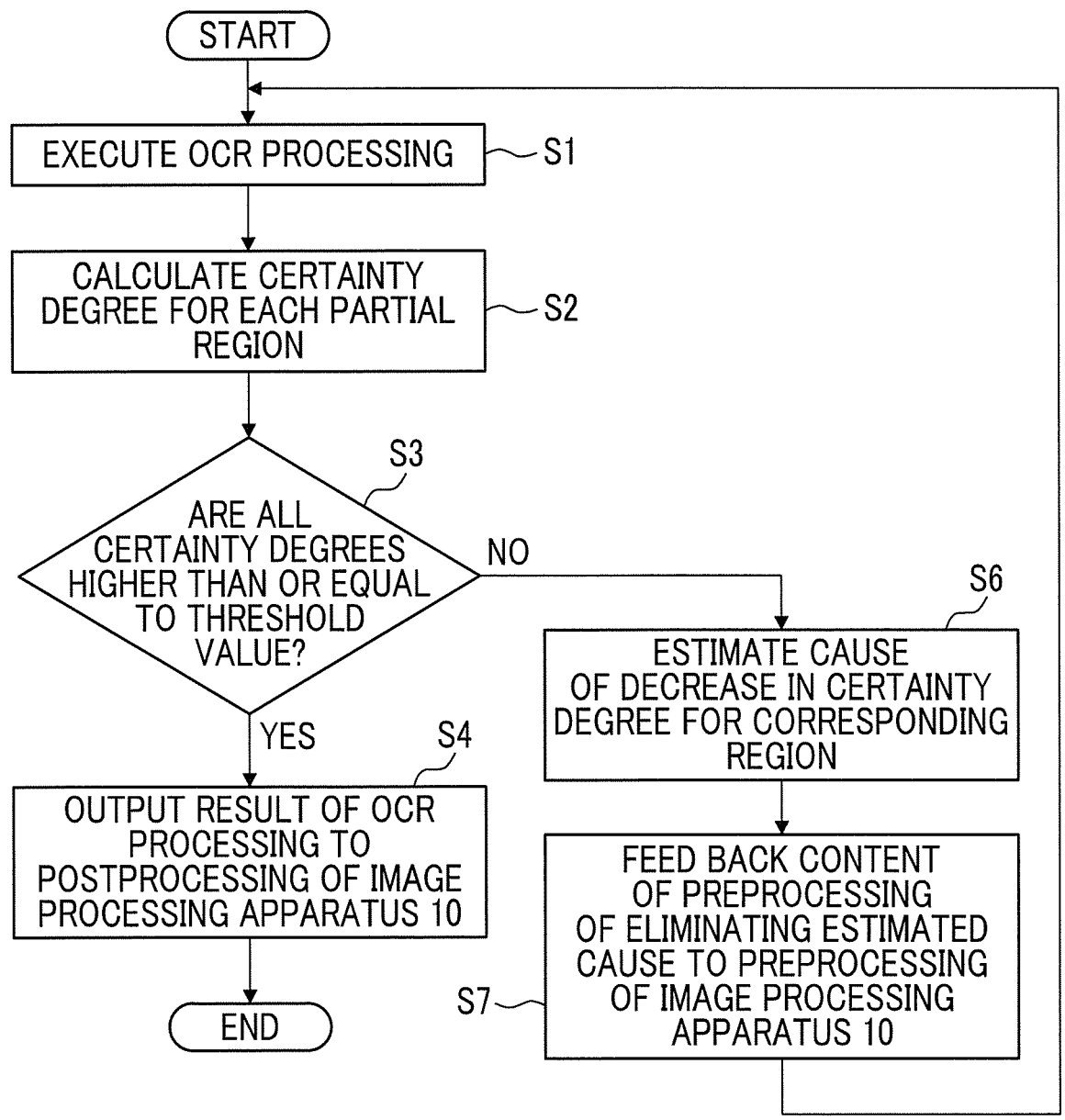
FIG. 16 is a flowchart for describing one example of processing executed by an OCR processing server in Exemplary Embodiment 5.

FIG. 16 is a flowchart for describing one example of processing executed by the OCR processing server 20 in Exemplary Embodiment 5. In FIG. 16, parts corresponding to FIG. 4 are designated by corresponding reference signs.

In the case of FIG. 16, the content of processing executed in a case where a negative result is obtained in step S3 is different from Exemplary Embodiment 1.

In a case where a negative result is obtained in step S3, the processor 21A in this exemplary embodiment estimates the cause of decrease in certainty degree for the corresponding region (step S6). The content of estimation is described in Exemplary Embodiment 4 and thus, will not be described.

Next, the processor 21A feeds back the content of the preprocessing of eliminating the estimated cause to the preprocessing of the image processing apparatus 10 (step S7).

For example, the content of processing to be requested includes the type of cleansing processing, the strength of the cleansing processing, and a parameter value to be used in the cleansing processing. For example, types of cleansing processing include processing of removing the ground tint or shading, processing of removing a stain, and processing of converting a white text or a colored text to a black text by removing the color of the background.

In decision of the content of the preprocessing to be fed back, the table of correspondence relationship prepared in advance, the learned model updated by machine learning, and the determination program may be used.

The table of correspondence relationship stores the estimated cause in association with the content of the preprocessing of eliminating the cause. Processing of step S6 and step S7 may be integrated, and the content of the recommended preprocessing may be stored in association with classification of images similar to the image data corresponding to the partial regions.

In the case of using the learned model, the content of the preprocessing of eliminating the cause is output in a case where the estimated cause is input into the learned model. Even in this case, processing of step S6 and step S7 may be integrated, and the content of the recommended preprocessing may be output in a case where the image data corresponding to the partial regions is input into the learned model.

In the case of using the determination program, the content of the preprocessing of eliminating the cause considered to decrease the certainty degree is output by performing branching based on individual determinations once or repeating the branching a plurality of times. Even in this case, processing of step S6 and step S7 may be integrated, and the content of the recommended preprocessing may be output by repeating determination corresponding to the features extracted from the image data corresponding to the partial regions.

In the case of this exemplary embodiment, the immediately previously estimated cause and the content of the preprocessing requested for the preprocessing are machine-learned as training data. The unit of learning is not limited to the partial region and may be a unit of the type of object, a unit of the type of original document, or a unit of similar images. Even in a case where the types of objects are the same, there is a possibility that the content of the preprocessing contributing to improvement in certainty degree varies in a case where the combination of the background and the text varies as in Table A and Table B in FIG. 5. Thus, machine learning is performed in units of partial regions in this exemplary embodiment.

In this exemplary embodiment, reinforcement learning is employed in machine learning. In reinforcement learning, learning progresses in order to increase a reward. Thus, no reward or a low reward is assigned to the content of the preprocessing obtaining only a certainty degree lower than the threshold value. A high reward is provided to the content of the preprocessing in a case where a certainty degree higher than the threshold value is obtained like a case where a positive result is obtained in step S3.

The result of machine learning is used in decision of the content of the subsequent preprocessing. The subsequent preprocessing includes not only re-execution of the preprocessing accompanied by feedback but also the preprocessing with respect to the image data of a newly read original document.

In a case where the estimated cause is provided to the learned model subjected to reinforcement learning, the content of the preprocessing requested for eliminating the cause is output. Increasing the accuracy of reinforcement learning decreases the number of times of feedback. A possibility of increasing the certainty degree above the threshold value may be increased compared to the case of randomly selecting the content of the preprocessing.

After execution of step S7, the processor 21A returns to step S1 and waits for reception of the image data processed with the content of the requested preprocessing. Consequently, the text data having a certainty degree higher than the threshold value is provided to the postprocessing executed by the image processing apparatus 10, and improvement in the accuracy or the reliability of the result of the postprocessing is implemented. In addition, reduction of an effort to manually check or correct the recognized text data is implemented.

Exemplary Embodiment 6

Other processing executed by the OCR processing server 20 will be described.

In the above exemplary embodiments, the result of the OCR processing is output to the postprocessing of the image processing apparatus 10 collectively after the certainty degrees of all partial regions become higher than or equal to the threshold value. That is, in the above exemplary embodiments, only the result of the OCR processing in a stage where a high certainty degree is finally obtained for each partial region is collectively output to the postprocessing of the image processing apparatus 10.

In the case of this exemplary embodiment, the text data which is the result of the OCR processing is individually output to the postprocessing of the image processing apparatus 10 for each partial region in which a certainty degree higher than the threshold value is obtained.

Figure 17:
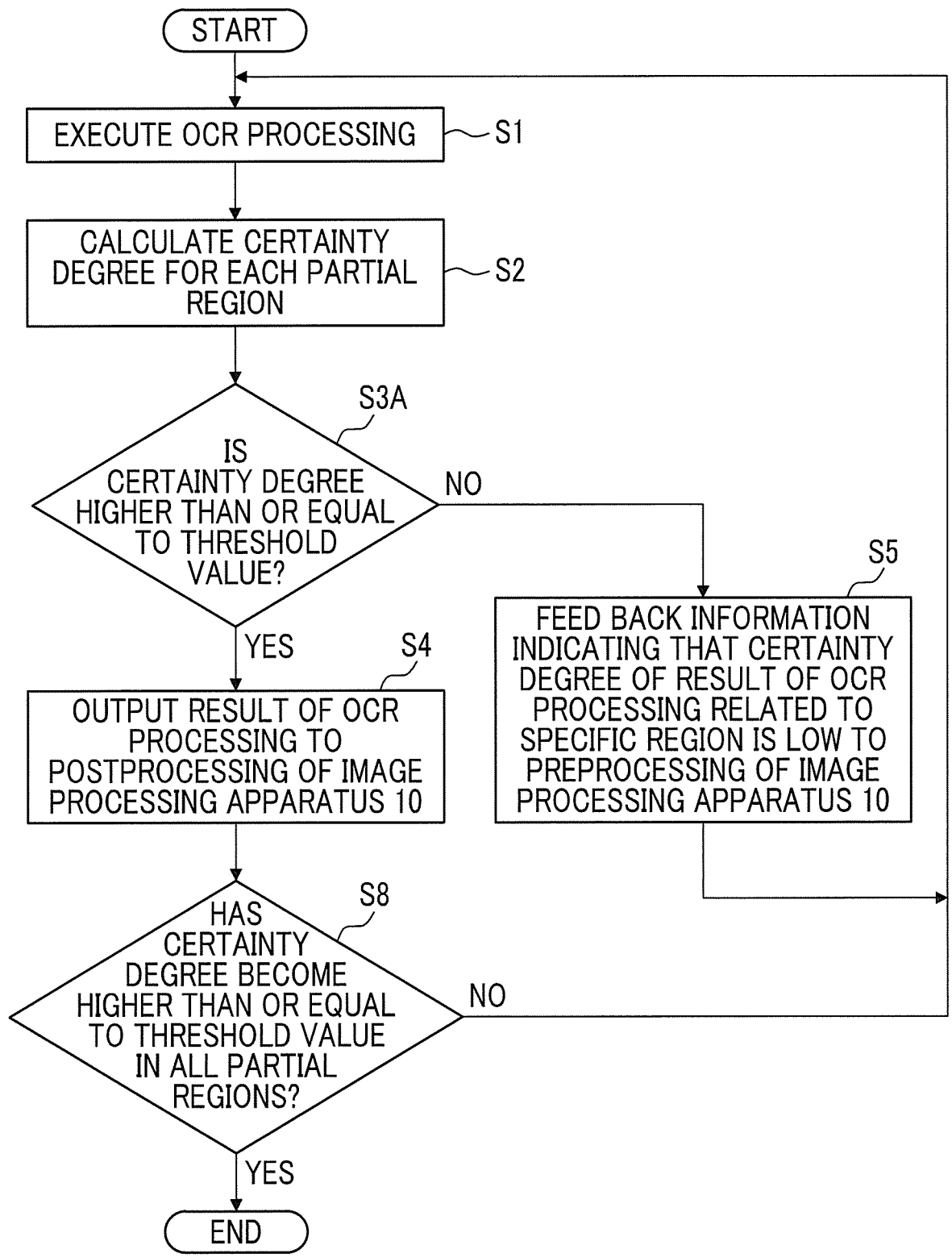
FIG. 17 is a flowchart for describing one example of processing executed by an OCR processing server in Exemplary Embodiment 6.

FIG. 17 is a flowchart for describing one example of processing executed by the OCR processing server 20 in Exemplary Embodiment 6. In FIG. 17, parts corresponding to FIG. 4 are designated by corresponding reference signs.

In the case of FIG. 17, the processor 21A determines whether or not the certainty degree is higher than or equal to the threshold value for each partial region after execution of step S2 (step S3A). In the case of the other exemplary embodiments, a determination as to whether or not the certainty degree is higher than or equal to the threshold value is performed for any of all partial regions.

The processor 21A executes processing of step S5 for a partial region for which a negative result is obtained in step S3A. Specifically, the processor 21A feeds back information indicating that the certainty degree of the result of the OCR processing related to a specific region for which a negative result is obtained is low to the preprocessing of the image processing apparatus 10.

The certainty may be fed back as in Exemplary Embodiment 2. Information for requesting changing of the content of the preprocessing may be fed back as in Exemplary Embodiment 3. The cause of decrease in certainty degree may be fed back as in Exemplary Embodiment 4. The content of the preprocessing to be requested to the image processing apparatus 10 may be fed back as in Exemplary Embodiment 5.

The processor 21A executes processing of outputting the result of the OCR processing to the postprocessing of the image processing apparatus 10 for a partial region for which a positive result is obtained in step S3A (step S4). The output here is executed for each partial region each time the certainty degree being higher than or equal to the threshold value is checked.

After execution of step S4, the processor 21A determines whether or not the certainty degree has become higher than or equal to the threshold value in all partial regions (step S8).

In a case where a negative result is obtained in step S8, the processor 21A returns to step S1. This case means that a partial region having a low certainty degree remains among the partial regions which are the target of the OCR processing.

In a case where a positive result is obtained in step S8, the processor 21A finishes the OCR processing with respect to the original document which is the processing target.

While the text data obtained by the OCR processing is sequentially output to the postprocessing from the partial region of which the certainty degree becomes higher than the threshold value in the case of this exemplary embodiment, all text data may be temporarily output to the postprocessing, and only the text data obtained for the partial region in which a high certainty degree is obtained may be retrospectively output to the postprocessing for replacement or overwriting.

Exemplary Embodiment 7

While the image processing apparatus 10 separates the image data into objects in the case of the above exemplary embodiments, the processing of separating the image data into objects may be executed on the OCR processing server 20 side.

Figure 18:
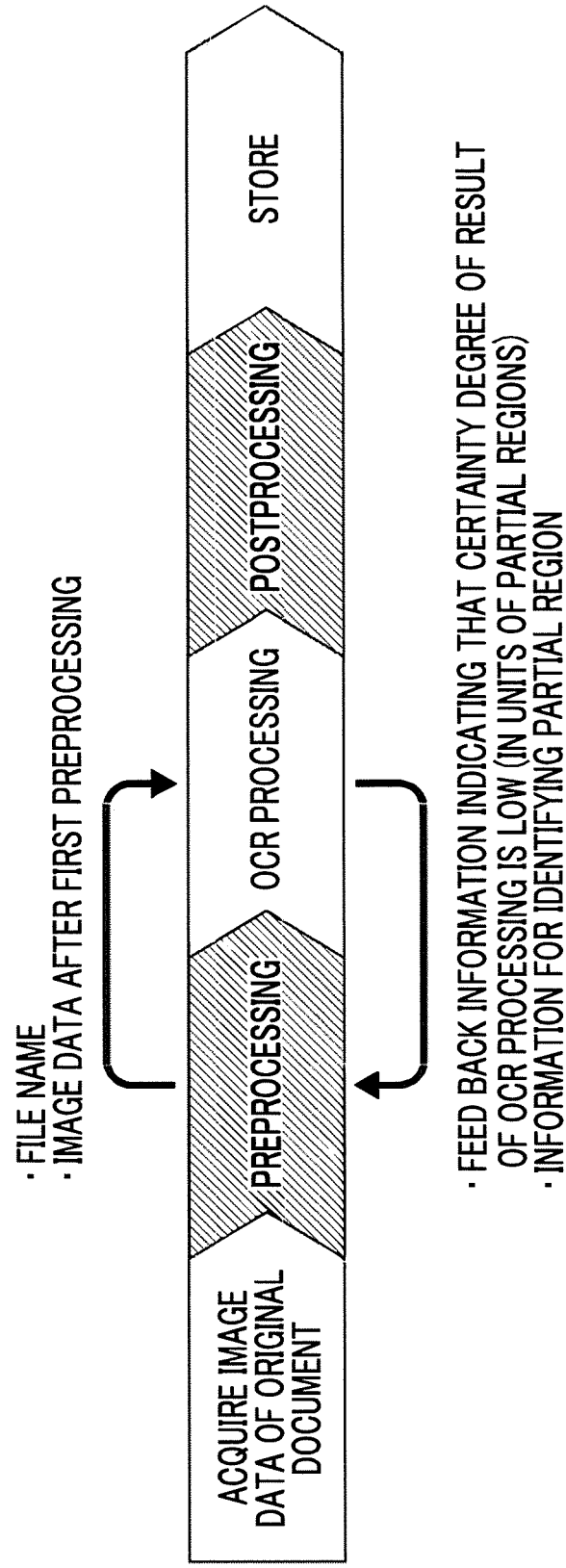
FIG. 18 is a diagram for describing a summary of processing executed in Exemplary Embodiment 7.

FIG. 18 is a diagram for describing a summary of processing executed in Exemplary Embodiment 7. In FIG. 18, parts corresponding to FIG. 3 are designated by corresponding reference signs.

In the case of FIG. 18, the file name to be used for distinguishing the processing target and the image data after the preprocessing are transmitted to the OCR processing from the preprocessing. The image data here corresponds to the entire image data read from the original document. The reason is that the processing of separating into objects is not executed yet.

In the feedback to the preprocessing from the OCR processing, information indicating that the certainty degree of the result of OCR is low is fed back in units of partial regions. The feedback also includes information for identifying the partial region.

In the case of this exemplary embodiment, the image processing apparatus 10 does not know the range of each individual partial region. Thus, for example, two coordinate points of diagonal positions prescribing the outer edges of the region may be included in the information for identifying the partial region having a rectangular shape. In addition, for example, a coordinate point providing one corner of the region and the directions and the lengths of two sides starting from the coordinate point may be included in the information for identifying the partial region having a rectangular shape. The information for identifying the partial region is not limited to the above two examples as long as the partial region which is the target of feedback may be specified.

Even in the case of Exemplary Embodiments 2 to 6, the processing of separating into objects may be executed in the OCR processing.

Exemplary Embodiment 8

In the case of the above exemplary embodiments, the OCR processing with respect to the original document which is the processing target is finished in a case where the text data extracted from the text region or the table region of which the certainty degree becomes higher than or equal to the threshold value is output to the postprocessing.

In this case, the finish of the OCR processing may be detected in the preprocessing by detecting output of the text data to the postprocessing from the OCR processing in the preprocessing or detecting reception of the text data by the postprocessing in the preprocessing.

The finish of the OCR processing may be securely known on the preprocessing side. For example, the image data may be deleted in a stage where there is no possibility of the preprocessing anymore. In addition, in a case where the image processing apparatus 10 executing the preprocessing is different from the image processing apparatus 10 executing the postprocessing, there is a possibility that output of the text data to the postprocessing from the OCR processing or reception of the text data by the postprocessing may not be known.

Therefore, in this exemplary embodiment, a function of notifying the preprocessing of the finish of the OCR processing is prepared in the OCR processing.

Figure 19:
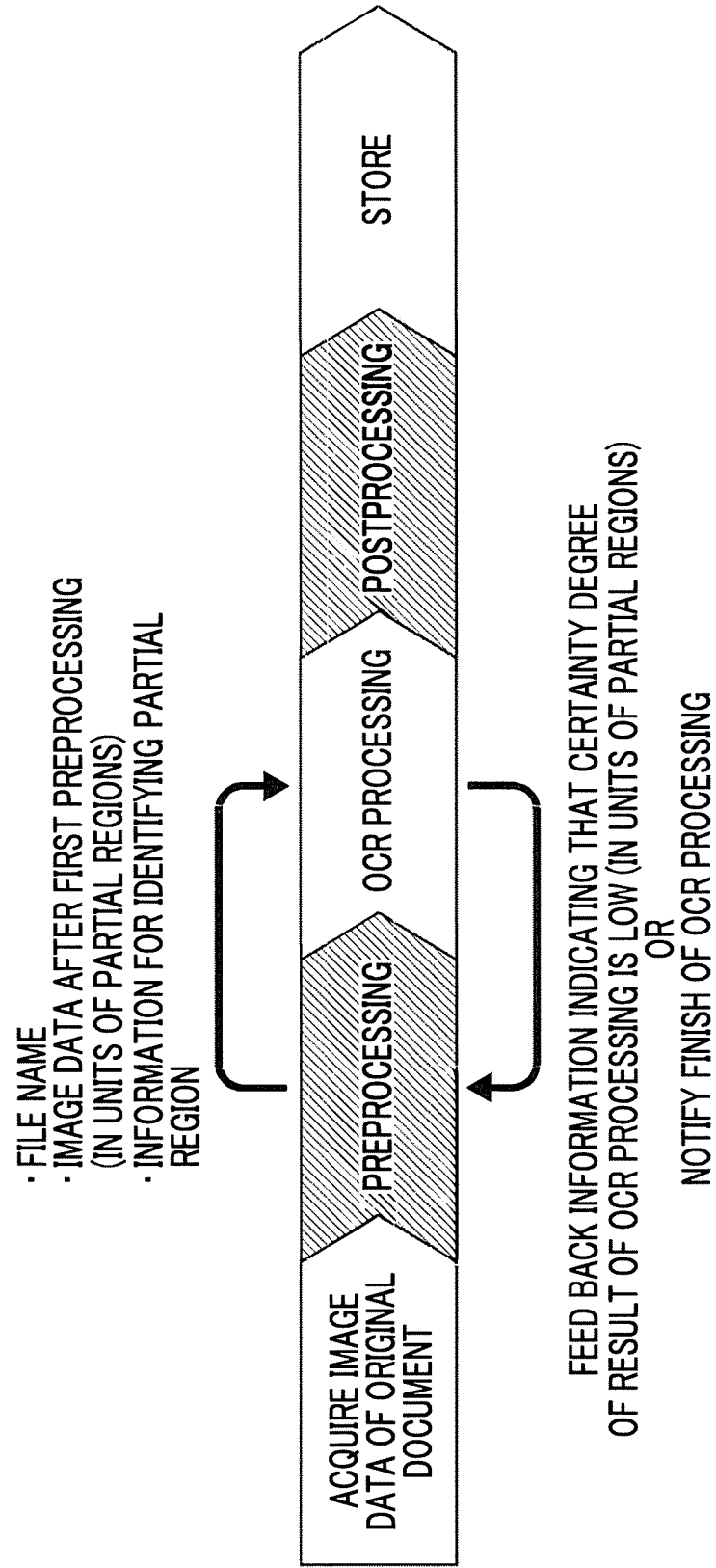
FIG. 19 is a diagram for describing a summary of processing executed in Exemplary Embodiment 8.

FIG. 19 is a diagram for describing a summary of processing executed in Exemplary Embodiment 8. In FIG. 19, parts corresponding to FIG. 3 are designated by corresponding reference signs.

In the case of FIG. 19, information indicating that the certainty degree of the result of the OCR processing is low is fed back to the preprocessing from the OCR processing while the partial region having a low certainty degree is included. In a case where the partial region having a low certainty degree is not present anymore, the finish of the OCR processing is notified.

Figure 20:
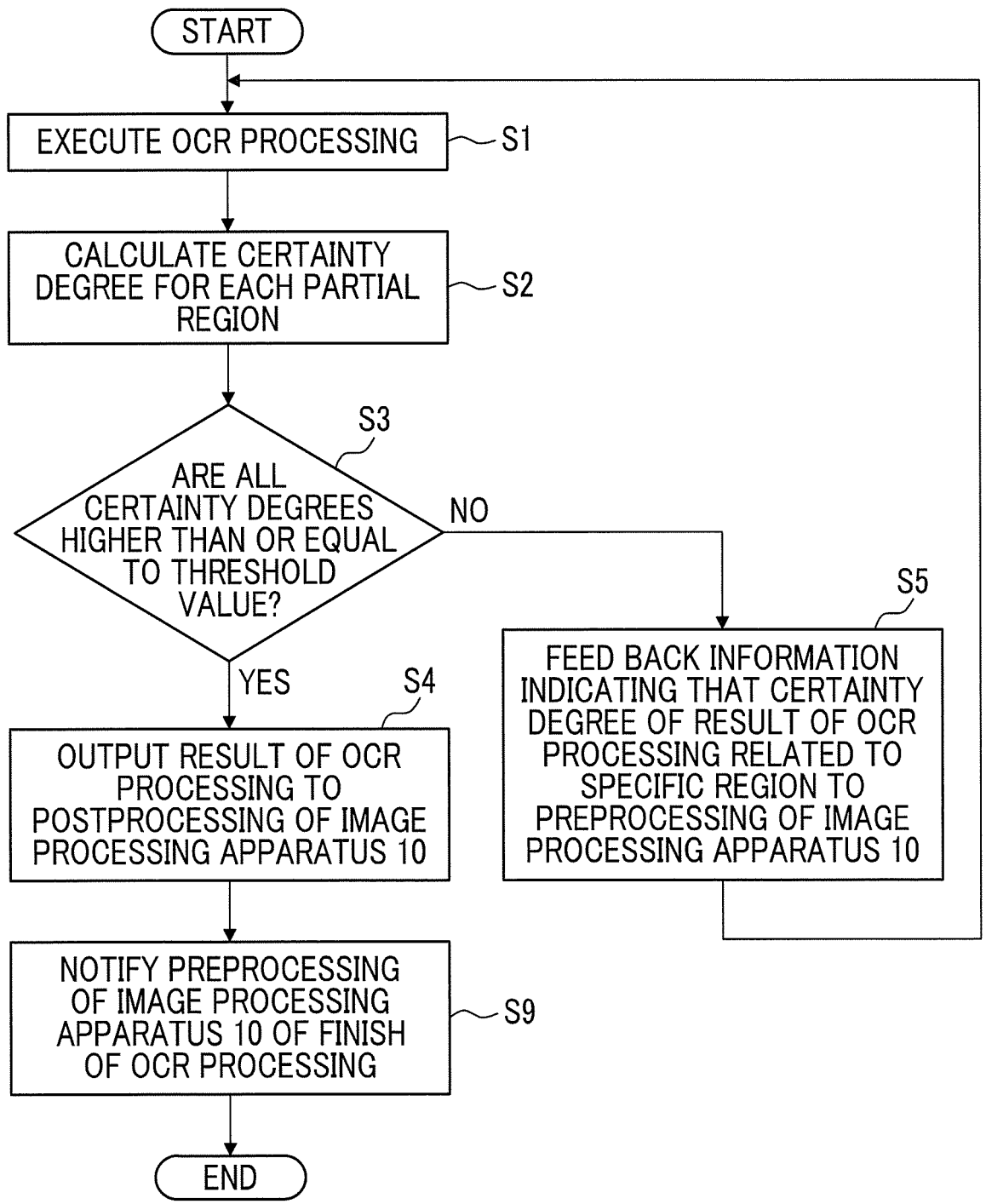
FIG. 20 is a flowchart for describing one example of processing executed by an OCR processing server in Exemplary Embodiment 8.

FIG. 20 is a flowchart for describing one example of processing executed by the OCR processing server 20 in Exemplary Embodiment 8. In FIG. 20, parts corresponding to FIG. 4 are designated by corresponding reference signs.

In the case of FIG. 20, the processor 21A notifies the preprocessing of the image processing apparatus 10 of the finish of the OCR processing after execution of step S4 (step S9). The preprocessing receiving the finish of the OCR processing means that the image data of the original document which is a target of notification does not need to be used in the preprocessing anymore. Thus, the image data to be set as a target may be securely deleted on the preprocessing side.

The function of notifying the finish of the OCR processing may be combined with any of the above exemplary embodiments.

Exemplary Embodiment 9

Figure 21:
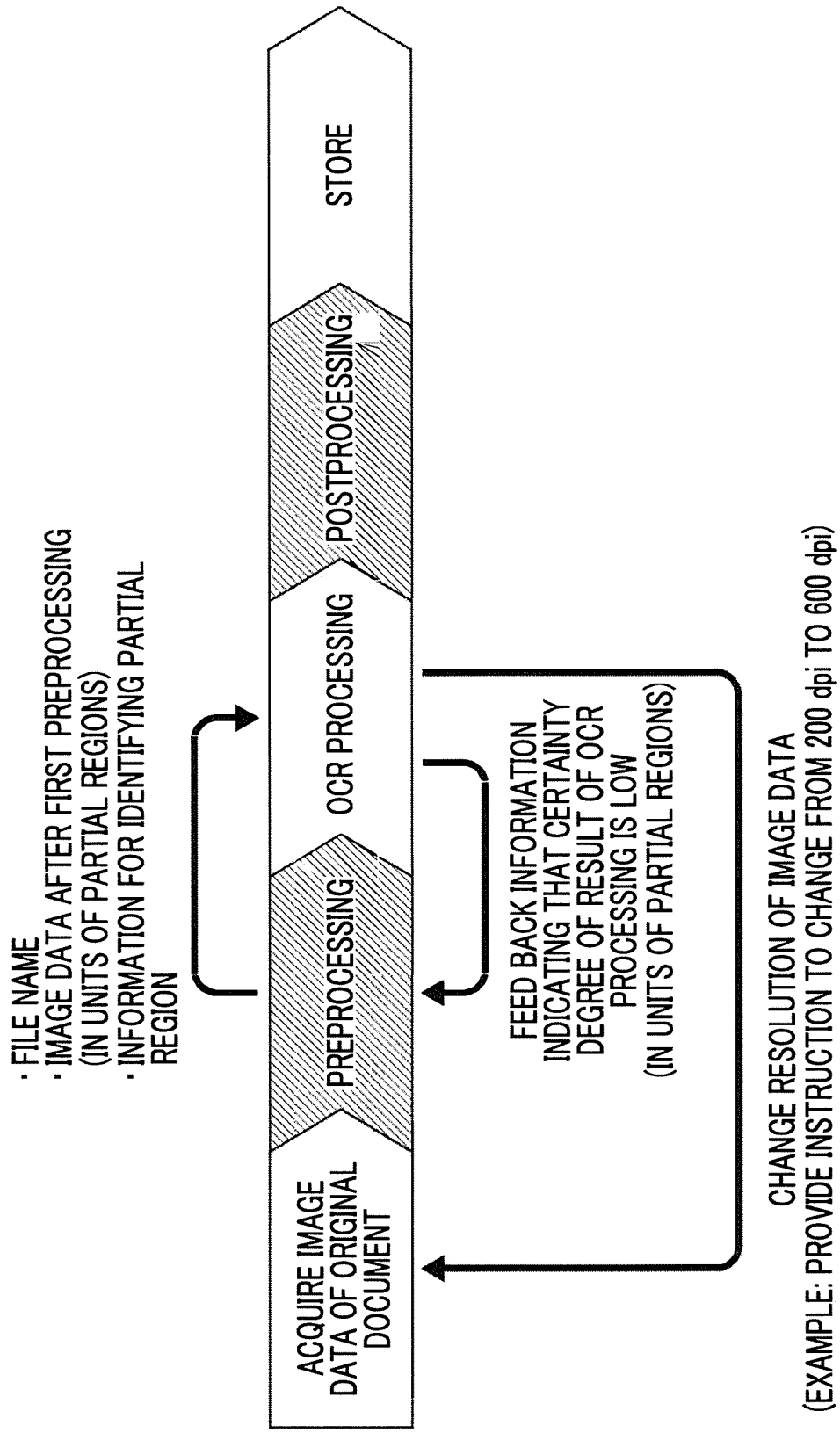
FIG. 21 is a diagram for describing a summary of processing executed in Exemplary Embodiment 9.

FIG. 21 is a diagram for describing a summary of processing executed in Exemplary Embodiment 9. In FIG. 21, parts corresponding to FIG. 3 are designated by corresponding reference signs.

While a feedback destination of information is only the preprocessing in the above exemplary embodiments, information is also fed back to processing of acquiring the image data of the original document in this exemplary embodiment.

For example, in a case where resolution that is used at the time of acquiring the image data is low with respect to the size of the text printed or written on the original document, there is a possibility that the certainty degree of the result of the OCR processing is decreased. In a case where non-matching of the resolution is the cause of decrease in certainty degree, the certainty degree is not improved even in a case where the content of the preprocessing is changed.

Therefore, in this exemplary embodiment, in a case where the size of the font included in the image data which is the target of the OCR processing is the cause of a low certainty degree, feedback of changing of the resolution of the image data to the processing of acquiring the image data of the original document is executed. In the example in FIG. 21, an instruction to change from 200 dpi to 600 dpi is provided. A technology for detecting the magnitude of the font size is known.

The feedback described in this exemplary embodiment may be combined with any of the above exemplary embodiments.

Other Exemplary Embodiments

While the exemplary embodiments of the present invention are described above, the technical scope of the present invention is not limited to the scope disclosed in the above exemplary embodiments. From the disclosure of the claims, the above exemplary embodiments subjected to various changes or improvements apparently fall in the technical scope of the present invention.

(1) For example, in the above exemplary embodiments, a case where a combination of the preprocessing and processing on a rear stage side is a combination of the cleansing processing and the OCR processing is described. However, a relationship between the preprocessing and the processing on the rear stage side is also considered in other cases. For example, the preprocessing may be extraction of a feature amount for face recognition, and the processing on the rear stage side may be face recognition using the extracted feature amount. In this case, the certainty degree is information or the like representing the accuracy of the result of face recognition. While the processing on the rear stage side is assumed to be the OCR processing in the above exemplary embodiments, any combination of the preprocessing and the processing on the rear stage side may be used.

(2) While the certainty degree is calculated in units of rows constituting the table assuming the original document illustrated in FIG. 5 in the case of the above exemplary embodiments, the above exemplary embodiments may also be applied to the case of calculating the certainty degree in units of columns.

(3) While the image processing apparatus 10 having a function of generating the image data by optically reading the original document and other functions is illustrated as one example of the apparatus applying the preprocessing to the image data provided to the OCR processing server 20 in the above exemplary embodiments, an image scanner specialized in acquiring the image data corresponding to the original document may be used as the image processing apparatus 10. The auto document feeder (ADF) may be disposed in the image scanner.

In addition, not only the smartphone or the digital camera used in imaging of the original document but also a computer externally acquiring the image data obtained by imaging the original document may be used in the apparatus applying the preprocessing to the image data provided to the OCR processing server 20. The computer here is used in the preprocessing, the postprocessing of the data after the OCR processing, and the like and may not have a function of capturing the image of the original document or a function of optically reading information about the original document.

(4) While a case where the image processing apparatus 10 and the OCR processing server 20 are configured as independent apparatuses is described in the above exemplary embodiments, the OCR processing may be executed in the image processing apparatus 10. In this case, all of the preprocessing, the OCR processing, and the postprocessing are executed inside the image processing apparatus 10. In this case, the preprocessing, the OCR processing, and the postprocessing may be executed in a preprocessing unit, a OCR processing unit, and a postprocessing unit inside the image processing apparatus 10, respectively.

(5) While a case where the postprocessing of processing the text data obtained by the OCR processing is passed to the image processing apparatus 10 executing the preprocessing is described in the above exemplary embodiments, the text data obtained by the OCR processing may be output to a processing apparatus different from the image processing apparatus 10 executing the preprocessing.

(6) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
acquire image data from preprocessing apparatus;
execute processing the acquired image data
calculate feedback information related to accuracy of a result of the processing for each partial region of an image corresponding to the acquired image data;
notify the preprocessing apparatus of the feedback information related to the accuracy, wherein the feedback information comprising information for specifying a corresponding partial region; and
acquire the image data from different preprocessing apparatus which is newly executed after notifying the preprocessing apparatus of the feedback information.

2. The information processing apparatus according to claim 1,
wherein the processor is configured to
calculate the feedback information related to the accuracy of the result of processing for each of a plurality of small regions into which the partial region is further divided, and notify the preprocessing apparatus of the accuracy of the result of processing calculated for each of the plurality of small regions collectively or individually.

3. The information processing apparatus according to claim 1,
wherein the feedback information related to the accuracy indicates that the accuracy of the result of processing is lower than a predetermined threshold value.

4. The information processing apparatus according to claim 1,
wherein the processor is configured to
estimate a cause of the accuracy of the result of processing being lower than a predetermined threshold value, and
notify the preprocessing apparatus of the estimated cause as the feedback information related to the accuracy.

5. The information processing apparatus according to claim 4,
wherein the feedback information comprising information related to a text or a background included in the partial region.

6. The information processing apparatus according to claim 4,
wherein the processor is configured to estimate the cause by including accuracy of a result of processing of which a target is the entire image data.

7. The information processing apparatus according to claim 4,
wherein the processor is configured to estimate the cause based on information about a content of processing provided from the preprocessing apparatus.

8. The information processing apparatus according to claim 4,
wherein the processor is configured to estimate the cause based on a history of the estimated cause for another image data similar to the image data.

9. The information processing apparatus according to claim 4,
wherein the processor is configured to estimate the cause based on a difference in accuracy between partial regions of the same type.

10. The information processing apparatus according to claim 1,
wherein the feedback information comprising information for providing an instruction to change a content to the preprocessing apparatus.

11. The information processing apparatus according to claim 1,
wherein the feedback information comprising information for providing an instruction of a content of processing to be requested to the preprocessing apparatus.

12. The information processing apparatus according to claim 11,
wherein the information for providing the instruction of the content to the preprocessing apparatus includes information for providing an instruction of a value of a parameter used in the preprocessing apparatus.

13. The information processing apparatus according to claim 11,
wherein the processor is configured to estimate the content of processing to be requested to the preprocessing apparatus based on a history of an instruction with respect to another image data similar to the image data.

14. The information processing apparatus according to claim 13,
wherein the processor is configured to
learn the content notified to the preprocessing apparatus and accuracy of a result of processing of the partial region acquired again after notification as training data, and
estimate the content of processing to be requested to the preprocessing apparatus.

15. The information processing apparatus according to claim 1, wherein the feedback information comprising information indicating a certainty degree of a result of processing of the image data acquired again,
wherein the processor is configured to, in a case where the image data on which the different preprocessing apparatus is newly executed is acquired again, output the result of processing of the image data acquired again when the certainty degree of processing of each partial region corresponding to the image data is higher than a predetermined threshold value.

16. The information processing apparatus according to claim 1,
wherein the processor is configured to, in a case where the image data on which preprocessing apparatus with a different content is executed for a partial region in which accuracy lower than a predetermined threshold value is obtained is acquired again and the result of processing is higher than the threshold value, output the result of processing of the partial region in combination with the result of processing with respect to another partial region in which accuracy higher than the threshold value is obtained in previous processing.

17. The information processing apparatus according to claim 1,
wherein the processor is configured to share information for identifying the image data which is a target of the notification, with the preprocessing apparatus.

18. The information processing apparatus according to claim 1,
wherein the processor is configured to provide an instruction to increase resolution to the preprocessing apparatus of generating the image data.

19. The information processing apparatus according to claim 1,
wherein the processor is configured to notify the preprocessing apparatus of a finish of processing in a case where the accuracy of the result of processing exceeds a predetermined threshold value for all partial regions.

20. A non-transitory computer readable medium storing a program causing a computer to implement:
a function of acquiring image data from preprocessing apparatus;
a function of calculating feedback information related to accuracy of a result of processing for each partial region of an image corresponding to the acquired image data;
a function of notifying the preprocessing apparatus of the feedback information related to the accuracy, wherein the feedback information comprising information for specifying a corresponding partial region; and
a function of acquiring the image data from different preprocessing apparatus which is newly executed after notifying the preprocessing apparatus of the feedback information.

* * * * *